US012755702B2

(12) United States Patent
Kim et al.

(10) Patent No.: US 12,755,702 B2
(45) Date of Patent: Oct. 6, 2026

(54) DISPLAY DEVICE

(71) Applicant: LG Display Co., Ltd., Seoul (KR)

(72) Inventors: Byeongchul Kim, Paju-si (KR); Dongsup Sim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 122 days.

(21) Appl. No.: 18/789,355

(22) Filed: Jul. 30, 2024

(65) Prior Publication Data

US 2025/0069555 A1 Feb. 27, 2025

(30) Foreign Application Priority Data

Aug. 25, 2023 (KR) ........................ 10-2023-0111675

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2320/0247* (2013.01); *G09G 2330/023* (2013.01)

(58) Field of Classification Search
CPC .. G09G 3/3208; G09G 3/3233; G09G 3/3266; G09G 2300/0842; G09G 2310/061; G09G 2310/08; G09G 2320/0247; G09G 2330/023; G09G 2340/0435
See application file for complete search history.

(56) References Cited

U.S. PATENT DOCUMENTS

| | | | | |
|---|---|---|---|---|
| 10,916,198 B2 | 2/2021 | Lin et al. | | |
| 11,282,462 B2 | 3/2022 | Lin et al. | | |
| 11,651,736 B2 | 5/2023 | Lin et al. | | |
| 11,756,482 B2 | 9/2023 | Han | | |
| 11,887,546 B2 | 1/2024 | Lin et al. | | |
| 12,190,808 B2 | 1/2025 | Han | | |
| 2023/0237965 A1* | 7/2023 | Lin | .................... | H10K 59/1213 345/691 |
| 2024/0144881 A1* | 5/2024 | Park | ..................... | G09G 3/3233 |

FOREIGN PATENT DOCUMENTS

| | | |
|---|---|---|
| KR | 20200087711 A | 7/2020 |
| KR | 20220022406 A | 2/2022 |
| KR | 20230092487 A | 6/2023 |

* cited by examiner

*Primary Examiner* — Stacy Khoo
(74) *Attorney, Agent, or Firm* — Seed Intellectual Property Law Group LLP

(57) ABSTRACT

Disclosed is a display device that reduces a flicker phenomenon that occurs in a low-speed operation in a Variable Refresh Rate (VRR) mode by tuning a bias voltage based on a refresh rate and supplying the tuned bias voltage to a display panel. The display device includes a display panel including a plurality of pixels; and a power supply for supplying a bias voltage and an anode reset voltage to the plurality of pixels, wherein when the display device operates in a VRR mode, the display device is configured to adjust at least one of a level and an application time of the bias voltage based on a refresh rate in an anode reset frame.

22 Claims, 6 Drawing Sheets

DISPLAY DEVICE

CROSS-REFERENCE TO RELATED APPLICATION

This application claims priority from Korean Patent Application No. 10-2023-0111675 filed on Aug. 25, 2023, in the Korean Intellectual Property Office, and all the benefits accruing therefrom under 35 U.S.C. 119, the contents of which in its entirety are herein incorporated by reference.

BACKGROUND

Technical Field

The present disclosure relates to a display device.

Description of Related Art

Display devices used in computer monitors, TVs, mobile phones, etc., include organic light emitting display devices (OLED) that emit light on their own, and liquid crystal display devices (LCD) that require separate light sources.

A scope of application of the display device is becoming more diverse, ranging from computer monitors and TVs to personal portable devices. Research is being conducted on a display device that has a large display area but a reduced volume and weight.

This display device includes a data driving circuit that supplies data signals to data lines of the display panel, and a gate driving circuit that supplies gate signals to gate lines of the display panel.

BRIEF SUMMARY

The disclosure includes a display device that can reduce a flicker phenomenon that occurs in a low-speed operation in a VRR (Variable Refresh Rate) mode. The present disclosure provides a display device that can reduce a flicker phenomenon that occurs in a low-speed operation by adjusting at least one of a level and an application time of a bias voltage based on a refresh rate in an anode reset frame in the VRR (Variable Refresh Rate) mode.

Technical features of the disclosure according to the present disclosure are not limited to those mentioned here. Other technical features and characteristics according to the present disclosure that are not specifically mentioned should be understood based on following descriptions, and may be more clearly understood based on embodiments according to the present disclosure. Further, it will be easily understood that the technical features and characteristics according to the present disclosure may be realized using means shown in the claims or combinations thereof.

A display device according to one aspect of the present disclosure includes a display panel including a plurality of pixels; and a power supply for supplying a bias voltage and an anode reset voltage to the plurality of pixels, wherein when the display device operates in a VRR (Variable Refresh Rate) mode, the display device is configured to adjust at least one of a level and an application time of the bias voltage based on a refresh rate in an anode reset frame.

A display device according to another aspect of the present disclosure includes a display panel including a plurality of pixels, wherein each of the plurality of pixels includes: a light-emitting element for emitting light in response to a driving current; a driving transistor configured to control the driving current; a capacitor connected to and disposed between a high potential driving voltage and a gate electrode of the driving transistor; a first transistor configured to connect the gate electrode and a drain electrode of the driving transistor to each other in response to a first scan signal; a second transistor configured to apply a data voltage to a source electrode of the driving transistor in response to a second scan signal; a third transistor configured to apply the high-potential driving voltage to the source electrode of the driving transistor in response to a light-emission control signal; a fourth transistor configured to connect the drain electrode of the driving transistor and the light-emitting element to each other in response to the light-emission control signal to establish a current flow path between the high-potential driving voltage and the low-potential driving voltage; and a fifth transistor configured to apply a bias voltage to the source electrode of the driving transistor in response to a third scan signal, wherein when the display device operates in a VRR (Variable Refresh Rate) mode, the display device is configured to adjust at least one of a level and an application time of the bias voltage based on a refresh rate in an anode reset frame.

According to embodiments of the present disclosure, the flicker phenomenon that occurs in the low-speed operation in the VRR mode may be reduced by adjusting at least one of the level and the application time of the bias voltage applied to the pixels of the display panel based on the refresh rate in the anode reset frame.

Furthermore, according to embodiments of the present disclosure, even when the refresh rate changes according to the VRR mode, the flicker phenomenon may be reduced by supplying the bias voltage tuned to the characteristics of the display panel.

Furthermore, according to embodiments of the present disclosure, in the anode reset frame, the bias voltage tuned to suit the characteristics of the display panel and based on the reference range which the refresh rate falls within may be applied to the pixel circuit, thereby optimizing the flicker characteristics such that the quality of the image may be improved.

Furthermore, according to embodiments of the present disclosure, the pixels may operate at the lowered refresh rate when power consumption is required to be lowered or the low-speed operation is required, resulting in a power consumption reduction effect.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

DETAILED DESCRIPTIONS

Figure 1:
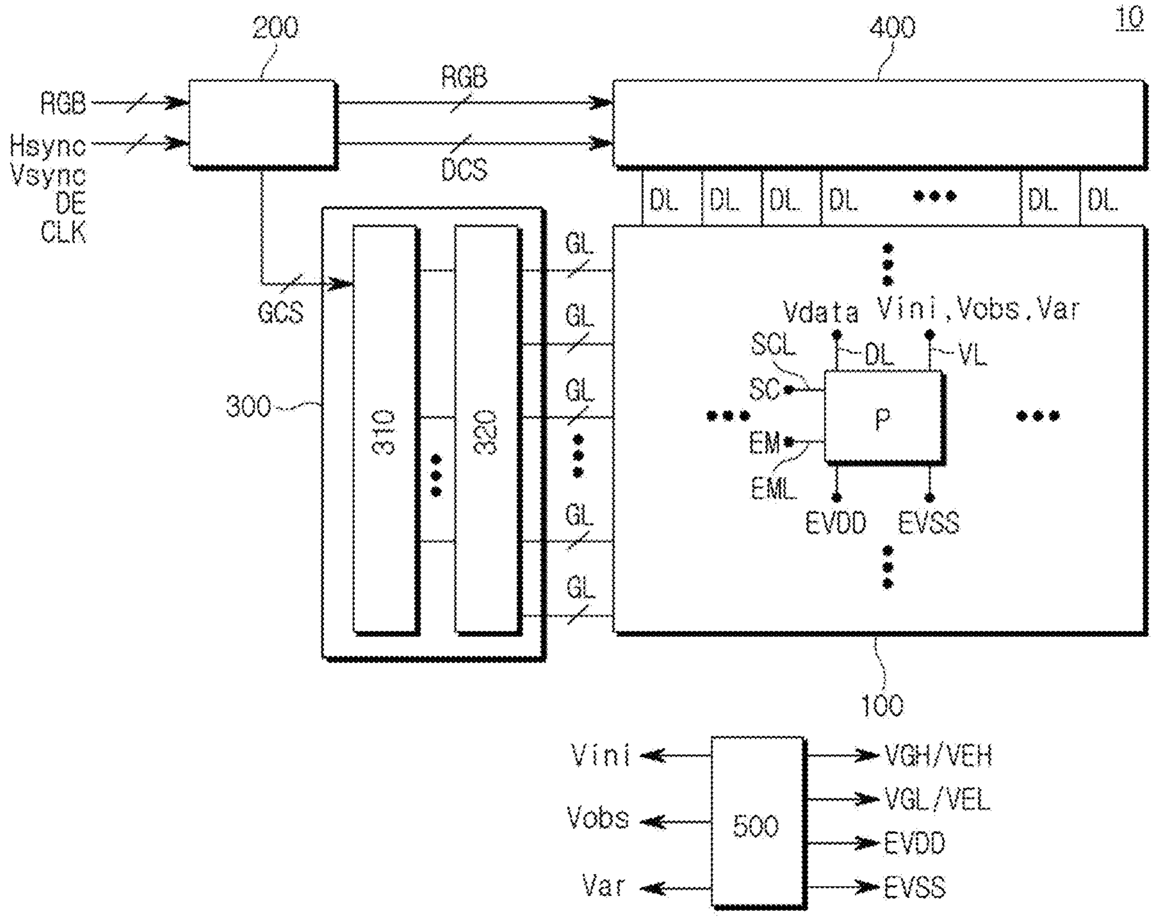
FIG. 1 is a block diagram schematically showing a display device according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure.

A shape, a size, a ratio, an angle, a number, etc., disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise," "comprising," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after," "subsequent to," "before," etc., another event may occur therebetween unless "directly after," "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first," "second," "third," and so on may be used herein to describe various elements, components, regions, layers and/or periods, these elements, components, regions, layers and/or periods should not be limited by these terms. These terms are used to distinguish one element, component, region, layer or section from another element, component, region, layer or period. Thus, a first element, component, region, layer or section as described under could be termed a second element, component, region, layer or period, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to," or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or.' That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, a display device according to some embodiments will be described.

FIG. 1 is a block diagram schematically showing a display device according to an embodiment of the present disclosure.

Referring to FIG. 1, a display device 10 includes a display panel 100 including a plurality of pixels P, a controller 200, and a gate driver 300 that supplies a gate signal to each of the plurality of pixels P, a data driver 400 that supplies a data signal to each of the plurality of pixels P, and a power supply 500 that supplies power required for operation to each of the plurality of pixels P.

In the display panel 100, a plurality of gate lines GL and a plurality of data lines DL intersect each other, and each of the plurality of pixels P are connected to the gate line GL and the data line DL. Specifically, one pixel P receives the gate signal from the gate driver 300 via the gate line GL, and receives the data signal from the data driver 400 via the data line DL, and receives a high potential driving voltage EVDD and a low potential driving voltage EVSS from the power supply 500 via a power supply line (not shown).

The gate line GL supplies a scan signal SC and a light-emission control signal EM to the pixel and the data line DL supplies a data voltage Vdata to the pixel. Furthermore, according to various embodiments, the gate line GL may include a plurality of scan lines SCL that supply the scan signal SC and a light-emission control signal line EML that supplies the light-emission control signal EM. Furthermore, the plurality of pixels P may additionally include a power line VL and may receive a bias voltage Vobs, an initialization voltage Vini, and an anode reset voltage Var via the power line VL.

Furthermore, each pixel P includes a light-emitting element and a pixel circuit that controls an operation of the light-emitting element. The pixel circuit includes a plurality of switching elements, a driving element, and a capacitor. In this regard, each of the switching element and the driving element may be embodied as a thin-film transistor. In the pixel circuit, the driving element controls an amount of current supplied to the light-emitting element based on the data voltage to adjust an amount of light emitted from the light-emitting element. Furthermore, the plurality of switching elements receives the scan signal SC supplied via the plurality of scan lines SCL and the light-emission control signal EM supplied via the light-emission control line EML and operates the pixel circuit based on the scan signal SC and the light-emission control signal EM.

The display panel 100 may be embodied as a non-transmissive display panel or a transmissive display panel. The transmissive display panel may be applied to a transparent display device where an image is displayed on a screen and a real object in a background is visible to a viewer in front of the display device. The display panel 100 may be manufactured as a flexible display panel. The flexible display panel may be embodied as an OLED panel using a plastic substrate.

The pixels P may include a red pixel, a green pixel, and a blue pixel to emit light of corresponding colors. The pixels P may further include a white pixel. Each of the pixels P includes a pixel circuit.

Touch sensors may be disposed on the display panel 100. Touch input may be sensed using separate touch sensors or may be sensed through the pixels P. The touch sensors may be disposed on the screen of the display panel in an on-cell type or add-on type or may be embodied as in-cell type touch sensors built into the display panel 100.

The controller 200 processes image data RGB input from an external source such as a host system so as to be adapted to a size and a resolution of the display panel 100 and supplies the processed image data to the data driver 400. The controller 200 generate a gate control signal GCS and a data control signal DCS based on synchronization signals, for example, a clock signal CLK, a data enable signal DE, a horizontal synchronization signal Hsync, and a vertical synchronization signal Vsync input from the external source, and supplies the generated gate control signal GCS and data control signal DCS to the gate driver 300 and the data driver 400, respectively, thereby controlling the gate driver 300 and the data driver 400.

The controller 200 may be configured to be coupled to various processors, for example, a microprocessor, a mobile processor, an application processor, etc., depending on a type of a device on which the controller is mounted.

The host system may be any one of a television (TV) system, a set top box, a navigation system, a personal computer (PC), a home theater system, a mobile device, a wearable device, and a vehicle system.

The controller 200 multiplies an input frame frequency by i and controls an operation timing of each of the gate driver 300 and the data driver 400 using a frame frequency=the input frame frequency×i (i is a positive integer greater than 0) Hz. The input frame frequency is 60 Hz in the National Television Standards Committee (NTSC) scheme and is 50 Hz in the Phase-Alternating Line (PAL) scheme.

The controller 200 generates a signal so that the pixel may operate at various refresh rates. That is, the controller 200 generates operation-related signals such that the pixel may operate in a Variable Refresh Rate (VRR) mode or a refresh rate thereof may be switchable between a first refresh rate and the second refresh rate. For example, the controller 200 may simply change a rate of a clock signal, may generate a synchronization signal to generate a horizontal blank or a vertical blank, or may operate the gate driver 300 in a mask manner such that the pixel P may operate at various refresh rates.

The controller 200 generates, based on the timing signals Vsync, Hsync, and DE received from the host system, the gate control signal GSC for controlling the operation timing of the gate driver 300, and the data control signal DSC for controlling the operation timing of the data driver 400. The controller 200 controls the operation timings of the gate driver 300 and the data driver 400 to synchronize the gate driver 300 and the data driver 400 with each other.

A level shifter (not shown) converts a voltage level of the gate control signal GSC output from the controller 200 into a gate on voltage VGL and VEL and a gate off voltage VGH and VEH which in turn are supplied to the gate driver 300. The level shifter converts a low level voltage of the gate control signal GSC to a gate low voltage VGL, and converts a high level voltage of the gate control signal GSC to a gate high voltage VGH. The gate control signal GSC includes a start pulse and a shift clock.

The gate driver 300 supplies the scan signal SC to the gate line GL according to the gate control signal GCS supplied from the controller 200. The gate driver 300 may be disposed at one side or each of both opposing sides of the display panel 100 and in a GIP (Gate In Panel) manner.

The gate driver 300 sequentially outputs the gate signal to the plurality of gate lines GL under control of the controller 200. The gate driver 300 may shift the gate signal using a shift register and sequentially supply the shifted gate signal to the gate lines GL.

The gate signal may include the scan signal SC and the light-emission control signal EM in an organic light-emitting display device. The scan signal SC includes a scan pulse swinging between the gate on voltage VGL and the gate off voltage VGH. The light-emission control signal may include a light-emission control signal pulse that swings between the gate on voltage VEL and the gate off voltage VEH.

The scan pulse is synchronized with the data voltage Vdata to select pixels of a line to which data is to be written. The light-emission control signal defines a light-emitting time of each of pixels.

The gate driver 300 may include a light-emission control signal driver 310 and at least one scan driver 320. The light-emission control signal driver 310 outputs the light-emission control signal pulse in response to the start pulse and the shift clock received from the controller 200 and sequentially shifts the light-emission control signal pulse according to the shift clock. Each of the at least one scan driver 320 outputs the scan pulse in response to the start pulse and the shift clock received from the controller 200, and shifts the scan pulse according to a shift clock timing.

The data driver 400 converts the image data RGB into the data voltage Vdata according to the data control signal DCS supplied from the controller 200, and supplies the converted data voltage Vdata to the pixel P via the data line DL.

In FIG. 1, it is illustrated that one data driver 400 is disposed at one side of the display panel 100. However, the number and a position of the data drivers 200 are not limited thereto. That is, the data driver 400 may be embodied as a plurality of integrated circuits (ICs) which may be disposed at one side of the display panel 100 and may be separately arranged along the one side.

The power supply 500 generates direct current (DC) power for operating a pixel array of the display panel 100 and the display panel driver using a DC-DC converter. The DC-DC converter may include a charge pump, a regulator, a buck converter, a boost converter, etc. The power supply 500 receives a DC input voltage applied from the host system (not shown) and generates DC voltages such as the gate on voltage VGL and VEL, the gate off voltage VGH and VEH, the high-potential driving voltage EVDD, the low-potential driving voltage EVSS, etc. The gate on voltage VGL and VEL and the gate off voltage VGH and VEH are supplied to the level shifter (not shown) and the gate driver 300. Each of the high-potential driving voltage EVDD and the low-potential driving voltage EVSS is commonly supplied to the pixels.

Furthermore, the power supply 500 may generate direct current voltages such as the initialization voltage Vini, the bias voltage Vobs, and the anode reset voltage Var. The initialization voltage Vini, the bias voltage Vobs, and the anode reset voltage Var are supplied to the pixel P via the power line VL. In this regard, the power line VL may include a bias voltage bus line VobsL, an anode reset voltage bus line VarL, and an initialization voltage bus line ViniL. In one example, the bias voltage bus line VobsL, the anode reset voltage bus line VarL, and the initialization voltage bus line ViniL may be disposed between the gate driver 300 and the display area AA.

Figure 2:
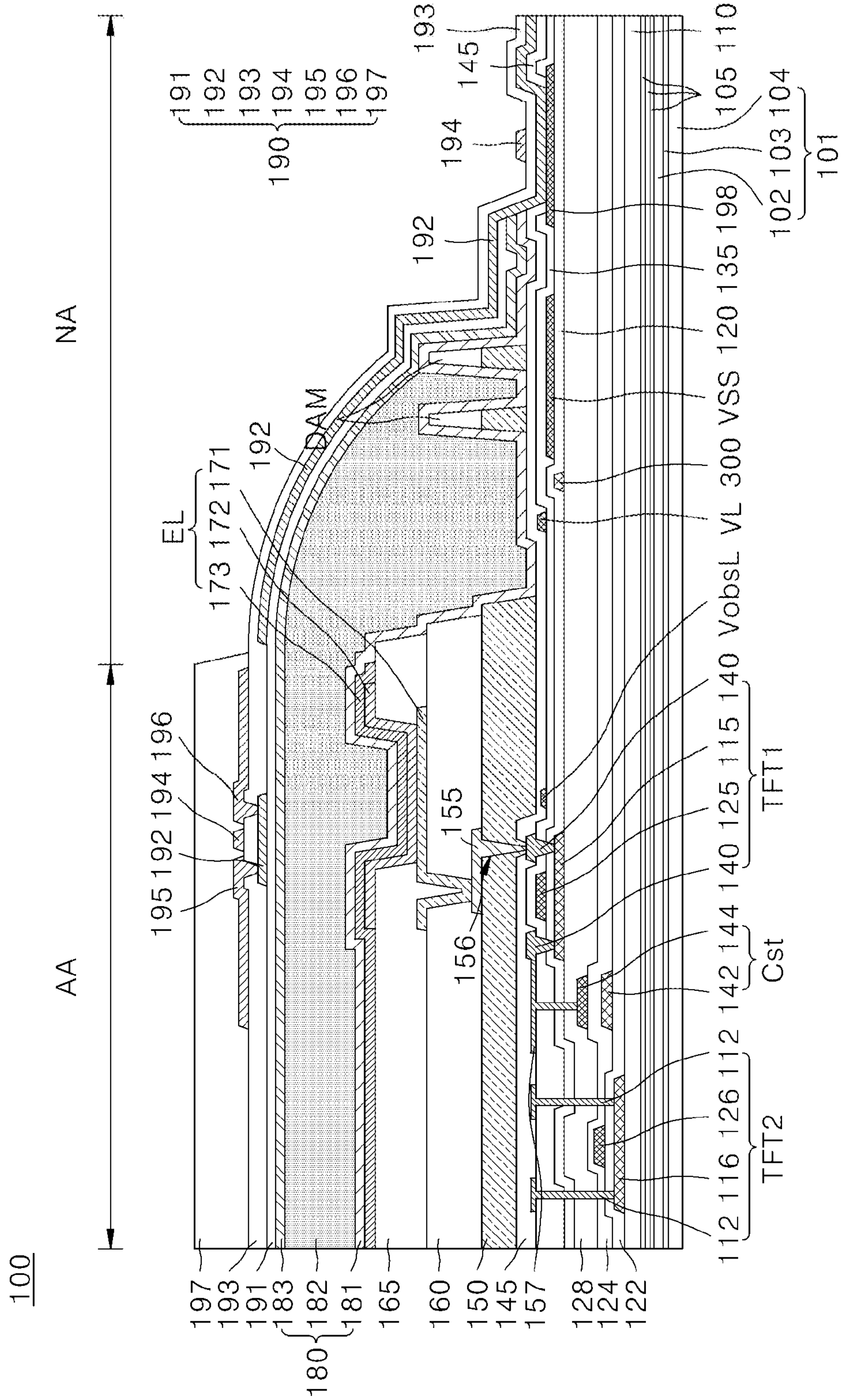
FIG. 2 is a cross-periodal view showing a stack structure of a display device according to an embodiment of the present disclosure.

FIG. 2 is a cross-periodal view showing a stack structure of a display device according to an embodiment of the present disclosure.

Referring to FIG. 2, the display panel 100 includes a display area AA where the pixel P is located, and a non-display area NA surrounding the display area AA. The gate driver 300 and the data driver 400 are disposed in the non-display area NA.

The display panel 100 according to an embodiment of the present disclosure includes a substrate 101, a thin-film transistor TFT1 and TFT2, a bank layer 165, a light-emitting element EL, an encapsulation layer 180, a touch layer 190, a touch protective film 197, a dam DAM, and a pad 198.

The thin-film transistor TFT1 may be disposed on the substrate 101. The thin-film transistor TFT1 drives the light-emitting element EL of the display area AA.

The substrate 101 supports various components of the display panel 100. The substrate 101 may be made of a transparent insulating material, such as glass or plastic. When the substrate 101 is made of plastic, the substrate may be referred to as a plastic film or plastic substrate. For example, the substrate 101 may be in a form of a film including one of polyimide-based polymer, polyester-based polymer, silicone-based polymer, acryl-based polymer, polyolefin-based polymer, and copolymer thereof. However, embodiments of the present disclosure are not limited thereto.

The thin-film transistor TFT1 may include a semiconductor layer 115, a gate electrode 125, and source and drain electrodes 140. The thin-film transistor TFT is a driving transistor (T1 in FIG. 4). The semiconductor layer 115 may be made of polysilicon (p-Si). In this case, a predetermined area thereof may be doped with impurities. Furthermore, the semiconductor layer 115 may be made of amorphous silicon a-Si or various organic semiconductor materials such as pentacene. The semiconductor layer 115 may be made of oxide. Embodiments of the present disclosure are not limited to the material constituting the semiconductor layer 115. The semiconductor layer 115 may be an active layer. However, embodiments of the present disclosure are not limited thereto.

The gate electrode 125 may be disposed on top of the semiconductor layer 115. The gate electrode 125 may be made of a variety of conductive materials, such as magnesium (Mg), aluminum (Al), nickel (Ni), chromium (Cr), molybdenum (Mo), tungsten (W), gold (Au) or an alloy thereof, etc. However, embodiments of the present disclosure are not limited thereto.

A gate insulating layer may be disposed between the semiconductor layer 115 and the gate electrode 125. The gate insulating layer may be a layer to insulate the semiconductor layer 115 and the gate electrode 125 from each other, and may be made of an insulating material. For example, the gate insulating layer may be composed of a single or double layer made of silicon oxide (SiOx) or silicon nitride (SiNx). However, embodiments of the present disclosure are not limited thereto.

The source and drain electrodes 140 may be electrically connected to the semiconductor layer 115 and spaced apart from each other. The source and drain electrodes 140 may be disposed on the insulating layer. Each of the source and drain electrodes 140 may be made of a conductive material, for example, copper (Cu), aluminum (Al), molybdenum (Mo), titanium (Ti) or an alloy thereof, etc. However, embodiments of the present disclosure are not limited thereto.

The capacitor Cst may be disposed on the substrate 101. The capacitor Cst may include a first gate electrode 142 and a second gate electrode 144. The gate insulating layer 124 may be disposed between the first gate electrode 142 and the second gate electrode 144. At least one of the first gate electrode 142 and the second gate electrode 144 may be connected to the electrode of the thin-film transistor TFT1. The capacitor Cst may be connected to the thin-film transistor TFT1 via a connection electrode 157.

Another thin-film transistor TFT2 may be disposed on the substrate 101. The thin-film transistor TFT2 may include a semiconductor layer 116, a gate electrode 126, and source and drain electrodes 112. The thin-film transistor TFT2 may be one of first to seventh transistors T1 to T7 (in FIG. 4). A gate insulating layer 122 may be disposed between the semiconductor layer 116 and the gate electrode 126.

An interlayer insulating layer 128 may be disposed between the thin-film transistor TFT1 and the capacitor Cst, or between the thin-film transistor TFT1 and another thin-film transistor TFT2.

For convenience of illustration, among the various thin-film transistors that may be included in the display device 10, only the thin-film transistor TFT1 corresponding to the driving transistor (DT in FIG. 4) and the thin-film transistor TFT2 corresponding to the first transistor (T1 in FIG. 4) are shown. However, other thin-film transistors corresponding to the remaining switching transistors (T2 to T7 in FIG. 4) may be included in the display panel 100. Further, an example in which the thin-film transistor has a coplanar structure is described. However, the thin-film transistor may be implemented to have other structures such as a staggered structure. The present disclosure is not limited thereto.

As shown in FIG. 2, the thin-film transistor TFT includes the semiconductor layer 115 disposed on the interlayer insulating layer 128, the gate electrode 125 overlapping the semiconductor layer 115 while a second insulating layer 120 is interposed therebetween, and the source and drain electrodes 140 formed on a third insulating layer 135 and contacting the semiconductor layer 115.

The semiconductor layer 115 may act as an area where a channel is formed during an operation of the thin-film transistor TFT1. The semiconductor layer 115 may be made of an oxide semiconductor, or may be made of various organic semiconductors such as amorphous silicon (a-Si), polycrystalline silicon (poly-Si), or pentacene. The present disclosure is not limited thereto. The semiconductor layer 115 may be formed on the interlayer insulating layer 128. The semiconductor layer 115 may include a channel area, a source area, and a drain area. The channel area may overlap with the gate electrode 125 while the second insulating layer 120 is interposed therebetween. The channel area may be formed between the source and drain electrodes 140. The source area may be electrically connected to the source electrode 140 via a contact hole extending through the second insulating layer 120 and the third insulating layer 135. The drain area may be electrically connected to the drain electrode 140 via a contact hole extending through the second insulating layer 120 and the third insulating layer 135.

A buffer layer 105 and a first insulating layer 110 may be disposed between a semiconductor layer 116 and the substrate 101. The buffer layer 105 may delay diffusion of moisture and/or oxygen invading into the substrate 101. The first insulating layer 110 may protect the semiconductor layer 116 and may block various types of defects introduced from the substrate 101.

The uppermost layer of the buffer layer 105 in contact with the first insulating layer 110 may be made of a material having different etching characteristics from those of each of the remaining layers of the buffer layer 105, the first insulating layer 110, the second insulating layer 120 and the third insulating layer 135. The uppermost layer of the buffer layer 105 contacting the first insulating layer 110 may be made of one of silicon nitride ($SiN_x$) and silicon oxide ($SiO_x$). Each of the remaining layers of the buffer layer 105, the first insulating layer 110, the second insulating layer 120, and the third insulating layer 135 may be made of the other of silicon nitride ($SiN_x$) and silicon oxide ($SiO_x$). For example, the uppermost layer of the buffer layer 105 in contact with the first insulating layer 110 may be made of silicon nitride ($SiN_x$), while each of the remaining layers of the buffer layer 105, the first insulating layer 110, the second insulating layer 120, and the third insulating layer 135 may be made of silicon oxide ($SiO_x$). The present disclosure is not limited thereto.

The gate electrode 125 may be formed on the second insulating layer 120 and may overlap the channel area of the semiconductor layer 115 while the second insulating layer 120 is interposed therebetween. The gate electrode 125 may be made of a first conductive material and may be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. The present disclosure is not limited thereto.

The source electrode 140 may be connected to the exposed source area of the semiconductor layer 115 via the contact hole extending through the second insulating layer 120 and the third insulating layer 135. The drain electrode 140 may be opposite to the source electrode 140 and may be connected to the drain area of the semiconductor layer 115 via the contact hole extending through the second insulating layer 120 and the third insulating layer 135. Each of the source and drain electrodes 140 may be made of a second conductive material and may be embodied as a single layer or multi-layers made of molybdenum (Mo), aluminum (Al), chromium (Cr), gold (Au), titanium (Ti), nickel (Ni), neodymium (Nd), copper (Cu), or an alloy thereof. The present disclosure is not limited thereto.

A connection electrode 155 may be disposed between a first middle layer 150 and a second middle layer 160. The connection electrode 155 may be connected to the drain electrode 140 via a connection electrode contact hole 156 extending through a protective film 145 and the first middle layer 150. The connection electrode 155 may be made of a material having low resistivity and identical to or similar to that of the drain electrode 140. The present disclosure is not limited thereto.

The bias voltage line VobsL may be disposed in the same layer as a layer in which the source and drain electrodes 140 of the thin-film transistor TFT1 are disposed. This bias voltage line VobsL may be electrically connected to the source electrode of the thin-film transistor TFT1 corresponding to the driving transistor. Alternatively or additionally, the bias voltage line VobsL may be disposed in the gate electrode layer 125 and electrically connected to the source electrode of the thin-film transistor TFT via the connection electrode. Embodiments of the present disclosure are not limited thereto.

The light-emitting element EL including a light-emitting layer 172 may be disposed on a second middle layer 160 and a bank layer 165. The light-emitting element 170 may include an anode electrode 171, at least one light-emitting layer 172 formed on the anode electrode 171, and a cathode electrode 173 formed on the light-emitting layer 172.

The anode electrode 171 may be electrically connected to an exposed portion of the connection electrode 155 disposed on the first middle layer 150 and facing the second middle layer 160 via a contact hole extending through the second middle layer 160.

The anode electrode 171 of each pixel is not covered with the bank layer 165. The bank layer 165 may be made of an opaque material (e.g., black) to prevent light interference between adjacent pixels. In this case, the bank layer 165 may include a light-shielding material including at least one of color pigment, organic black, and carbon black. The present disclosure is not limited thereto.

The at least one light-emitting layer 172 may be formed on a portion of the anode electrode 171 corresponding to a light-emitting area defined by the bank layer 165. The at least one light-emitting layer 172 may include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer may be based on a light-emitting direction. In addition, the light-emitting layer 172 may include first and second light-emitting stacks facing each other while a charge generating layer is interposed therebetween. In this case, the light-emitting layer 172 of one of the first and second light-emitting stacks may generate blue light, while the light-emitting layer 172 of the other of the first and second light-emitting stacks may generate yellow-green light, so that white light may be generated from a combination of the first and second light-emitting stacks. The white light generated from the combination of the first and second light-emitting stacks may be incident on a color filter positioned above or below the light-emitting layer 172, such that a color image may be realized. In another example, each light-emitting layer 172 may generate each color light corresponding to each pixel without a separate color filter such that a color image may be rendered. For example, the light-emitting layer 172 of a red (R) pixel emits red light, the light-emitting layer 172 of a green (G) pixel emits green light, and the light-emitting layer 172 of a blue (B) pixel emits blue light.

The cathode electrode 173 may be formed to face the anode electrode 171 while the light-emitting layer 172 is disposed therebetween, and may receive the high-potential driving voltage EVDD.

An encapsulation layer 180 may block penetration of external moisture or oxygen into the light-emitting element EL that is vulnerable to external moisture or oxygen. To this end, the encapsulation layer 180 may include at least one inorganic encapsulation layer and at least one organic encapsulation layer. The present disclosure is not limited thereto. In the present disclosure, a structure of the encapsulation layer 180 in which a first encapsulation layer 181, a second encapsulation layer 182, and a third encapsulation layer 183 are sequentially stacked is described by way of example.

The first encapsulation layer 181 is formed on the substrate 101 on which the cathode electrode 173 has been formed. The third encapsulation layer 183 is formed on the substrate 101 on which the second encapsulation layer 182 has been formed. The third encapsulation layer 183 and the first encapsulation layer 181 may surround a top face, a bottom face and a side face of the second encapsulation layer 182. The first encapsulation layer 181 and the third encapsulation layer 183 may reduce or prevent penetration of external moisture or oxygen into the light-emitting element EL. Each of the first encapsulation layer 181 and the third encapsulation layer 183 may be made of an inorganic insulating material that may be deposited at a low temperature, such as silicon nitride ($SiN_x$), silicon oxide ($SiO_x$), silicon oxynitride (SiON), or aluminum oxide ($Al_2O_3$). Each of the first encapsulation layer 181 and the third encapsulation layer 183 is deposited in a low temperature atmosphere. Thus, during a deposition process of the first encapsulation layer 181 and the third encapsulation layer 183, the light-emitting element EL which is vulnerable to a high-temperature atmosphere may be prevented from being damaged.

The second encapsulation layer 182 serves as a shock-absorbing layer to relieve a stress between layers due to bending of the display device 10, and may planarize a step between layers. The second encapsulation layer 182 may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. The present disclosure is not limited thereto.

When the second encapsulation layer 182 is formed using an inkjet method, a dam DAM may be disposed to prevent the second encapsulation layer 182 in a liquid state from spreading to an edge of the substrate 101. The dam DAM may be closer to the edge of the substrate 101 than the second encapsulation layer 182 may be. The dam DAM may prevent the second encapsulation layer 182 in the liquid state from spreading to a pad area where a conductive pad disposed at the outermost side of the substrate 101 is disposed.

The dam DAM is designed to prevent diffusion of the second encapsulation layer 182. However, when the second encapsulation layer 182 overflows the dam DAM during a process, the second encapsulation layer 182 as an organic layer may be exposed to an outside, so that moisture or the like may invade the light-emitting element. Therefore, to prevent the invasion, at least ten dams DAM may be stacked.

The dam DAM may be disposed on a protective film 145 disposed on the third insulating layer 135 and in the non-display area NA. However, embodiments of the present disclosure are not limited thereto.

Further, the dam DAM, and the first middle layer 150 and the second middle layer 160 may be formed simultaneously. The first middle layer 150, and a lower layer of the dam DAM may be formed simultaneously. The second middle layer 160, and an upper layer of the dam DAM may be formed simultaneously. Thus, the dam DAM may have a double layer structure.

Accordingly, the dam DAM may be made of the same material as that of each of the first middle layer 150 and the second middle layer 160. However, embodiments of the present disclosure are not limited thereto.

The dam DAM may overlap the low-potential driving power line VSS. For example, the low-potential driving power line VSS may be formed in a layer under the dam DAM and in the non-display area NA.

The low-potential driving power line VSS and a gate driver 300 in a form of a gate in panel (GIP) may surround a periphery of the display panel. The low-potential driving power line VSS may be located outwardly of the gate driver 300. Further, the low-potential driving power line VSS may be connected to the anode electrode 171 to apply a common voltage thereto. The gate driver 300 is simply illustrated in plan and cross-periodal views. However, the gate driver 300 may be configured using a thin-film transistor TFT having the same structure as that of the thin-film transistor TFT of the display area AA.

The low-potential driving power line VSS is disposed outwardly of the gate driver 300. The low-potential driving power line VSS is disposed outwardly of the gate driver 300 and surrounds the display area AA. The low-potential driving power line VSS may be made of the same material as that of each of the source and drain electrodes 140 of the thin-film transistor TFT. The present disclosure is not limited thereto. For example, the low-potential driving power line VSS may be made of the same material as that of the gate electrode 125.

Further, the low-potential driving power line VSS may be electrically connected to the anode electrode 171. The low-potential driving power line VSS may supply the low-potential driving voltage EVSS to the plurality of pixels in the display area AA.

The low-potential driving power line VSS may be disposed on the third insulating layer 135. Alternatively or additionally, the low-potential driving power line VSS may be disposed on a layer of the source and drain electrodes 140 or the gate electrode 125 of the thin-film transistor TFT. However, embodiments of the present disclosure are not limited thereto.

The power line VL may be disposed between the gate driver 300 and the display area AA. The power line VL may be disposed in the same layer as a layer of the source and drain electrodes 140 of the thin-film transistor TFT. However, embodiments of the present disclosure are not limited thereto. The power line VL is shown in a simple manner in the cross-periodal view. However, the bias voltage bus line VobsL, the anode reset voltage bus line VarL, and the initialization voltage bus line ViniL constituting the power line VL may be arranged side by side and may be disposed in the same layer. Alternatively or additionally, the bias voltage bus line VobsL, the anode reset voltage bus line VarL, and the initialization voltage bus line ViniL may be disposed in different layers in an overlapping or non-overlapping manner. The bias voltage bus line may supply the bias voltage Vobs to the plurality of pixels in the display area AA. The anode reset voltage bus line may supply the anode reset voltage Var to the plurality of pixels in the display area AA. The initialization voltage bus line may supply the initialization voltage Vini to the plurality of pixels in the display area AA.

A touch layer 190 may be disposed on the encapsulation layer 180. In the touch layer 190, a touch buffer film 191 may be positioned between a touch sensor metal including touch electrode connection lines 192 and 194 and touch electrodes 195 and 196 and the cathode electrode 173 of the light-emitting element EL.

The touch buffer film 191 may prevent chemical (developer, etchant, etc.) used in a manufacturing process of the touch sensor metal disposed on the touch buffer film 191 or moisture from the outside from invading the light-emitting layer 172 including an organic material. Accordingly, the touch buffer layer 191 may prevent damage to the light-emitting layer 172 as vulnerable to the chemicals or moisture.

The touch buffer film 191 may be made of an organic insulating material that can be formed at a low temperature below or equal to a certain temperature (100 degrees Celsius) to prevent damage to the light-emitting layer 172 including the organic material vulnerable to a high temperature, and that has a low dielectric constant of 1 to 3. For example, the touch buffer layer 191 may be made of an acryl-based, epoxy-based, or siloxane-based material. The touch buffer film 191 made of the organic insulating material and having planarization performance may prevent damage to the encapsulation layer 180 and fracture of the touch sensor metal formed on the touch buffer film 191 due to bending of the organic light-emitting display device.

According to a mutual-capacitance-based touch sensor structure, the touch electrodes 195 and 196 may be disposed on the touch buffer layer 191, and the touch electrodes 195 and 196 may be disposed to intersect each other.

The touch electrode connection lines 192 and 194 may electrically connect the touch electrodes 195 and 196 to each other. The touch electrode connection lines 192 and 194 and the touch electrodes 195 and 196 may be positioned on different layers while the touch insulating film 193 is interposed therebetween.

The touch electrode connection lines 192 and 194 may overlap the bank layer 165, thereby preventing an aperture ratio from being lowered.

In one example, a portion of the touch electrode connection line 192 may extend along upper and side surfaces of the encapsulation layer 180 and upper and side surfaces of the dam DAM and then may be electrically connected to a touch driver circuit (not shown) via a pad 198. Thus, the touch electrodes 195 and 196 may be electrically connected to the touch driver circuit.

The portion of the touch electrode connection line 192 may receive a touch driving signal from the touch driver circuit and transmit the same to the touch electrodes 195 and 196, and may receive a touch sensing signal from the touch electrodes 195 and 196 and may transmit the same to the touch driver circuit.

A touch protective film 197 may be disposed on the touch electrodes 195 and 196. In the drawing, it is shown that the touch protective film 197 is disposed only on the touch electrodes 195 and 196. However, embodiments of the present disclosure are not limited thereto. The touch protective film 197 may extend to an inner end or an outer end of the dam DAM and thus may also be disposed on the touch electrode connection line 192.

Further, a color filter (not shown) may be further disposed on the encapsulation layer 180, and the color filter may be positioned on the touch layer 190 or between the encapsulation layer 180 and the touch layer 190.

Figure 3:
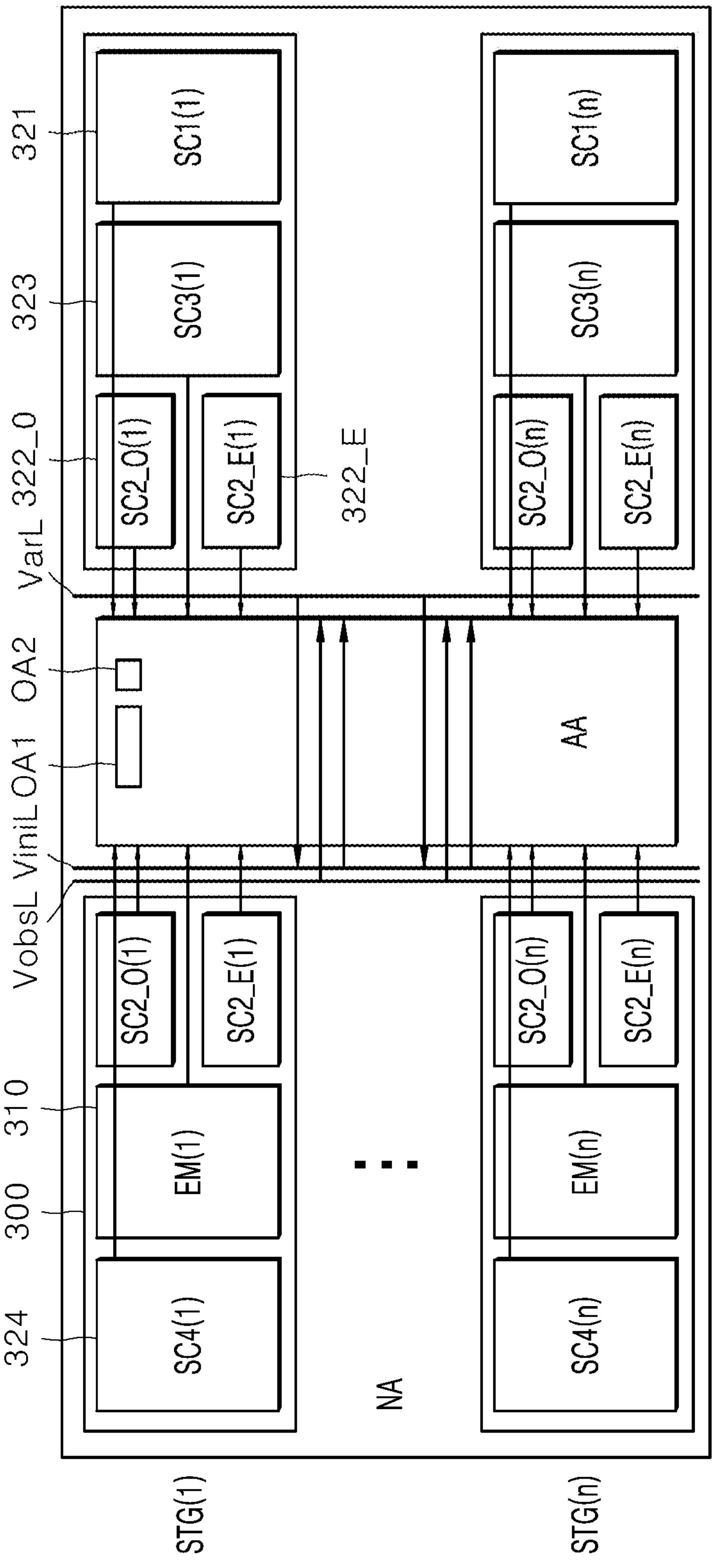
FIG. 3 is a diagram of a configuration of a gate driver in a display device according to an embodiment of the present disclosure.

FIG. 3 is a diagram of a configuration of a gate driver in a display device according to an embodiment.

Referring to FIG. 3, the gate driver 300 includes a light-emission control signal driver 310 and a scan driver 320. The scan driver 320 may include a first scan driver to a fourth scan driver 321, 322, 333, and 334. Further, the second scan driver 322 may be composed of an odd-numbered second scan driver 322_O and an even-numbered second scan driver 322_E.

The gate driver 300 may include shift registers which may be respectively disposed on both opposing sides of the display area AA symmetrically. Further, in the gate driver 300, the shift register on one side of the display area AA may be configured to include the second scan drivers 322_O and 322_E, the fourth scan driver 324 and the light-emission control signal driver 310. The shift register on the other side of the display area AA may be configured to include the first scan driver 321, the second scan drivers 322_O and 322_E, and the third scan driver 323. However, the present disclosure is not limited thereto, and the light-emission control signal driver 310 and the first to fourth scan drivers 321, 322, 323, and 324 may be arranged in a manner varying according to embodiments.

Each of stages STG(1) to STG(n) of the shift register may include each of first scan signal generators SC1(1) to SC1(*n*), each of second scan signal generators SC2_O(1) to SC2_O(n) and SC2_E(1) to SC2_E(n), each of third scan signal generators SC3(1) to SC3(*n*), each of fourth scan signal generators SC4(1) to SC4(*n*) and each of light-emission control signal generators EM(1) to EM(n).

The first scan signal generators SC1(*n*) to SC1(*n*) respectively output first scan signals SC1(*n*) to SC1(*n*) via a first scan line SCL1 of the display panel 100. The second scan signal generators SC2(1) to SC2(*n*) respectively output second scan signals SC2(1) to SC2(*n*) via a second scan line SCL2 of the display panel 100. The third scan signal generators SC3(1) to SC3(*n*) respectively output third scan signals SC3(1) to SC3(*n*) via a third scan line SCL3 of display panel 100. The fourth scan signal generators SC4(1) to SC4(*n*) respectively output fourth scan signals SC4(1) to SC4(*n*) via fourth scan line SCL4 of the display panel 100. The light-emission control signal generators EM(1) to EM(n) respectively output light-emission control signals EM(1) to EM(n) via a light-emission control line EML of the display panel 100.

The first scan signals SC1(*n*) to SC1(*n*) may be used as signals for operating an A-th transistor included in the pixel circuit such as a compensation transistor. The second scan signals SC2(1) to SC2(*n*) may be used as signals for operating a B-th transistor included in the pixel circuit, such as a data supply transistor. The third scan signals SC3(1) to SC3(*n*) may be used as signals for operating a C-th transistor included in the pixel circuit, such as a bias transistor. The fourth scan signals SC4(1) to SC4(*n*) may be used as signals for operating a D-th transistor included in the pixel circuit, such as an initialization transistor. The light-emission control signals EM(1) to EM(n) may be used as signals for operating an E-th transistor included in the pixel circuit, such as a light-emission control transistor. For example, when light-emission control transistors of pixels are controlled using the light-emission control signals EM(1) to EM(n), an emission time of the light-emitting element is varied.

Referring to FIG. 3, a bias voltage bus line VobsL, an anode reset voltage bus line VarL, and an initialization voltage bus line ViniL may be disposed between and connected to the gate driver 300 and the display area AA.

The bias voltage bus line VobsL, the anode reset voltage bus line VarL, and the initialization voltage bus line ViniL may respectively supply the bias voltage Vobs, the anode reset voltage Var, and the initialization voltage Vini from the power supply 500 to the pixel circuit.

In the drawing, it is shown that the bias voltage bus line VobsL, the anode reset voltage bus line VarL, and the initialization voltage bus line ViniL are disposed on only one of a left or right side of the display area AA. However, the present disclosure is not limited thereto. The bias voltage bus line VobsL, the anode reset voltage bus line VarL, and the initialization voltage bus line ViniL may be disposed on each of both opposing sides of the display area AA. When the bias voltage bus line VobsL, the anode reset voltage bus line VarL, and the initialization voltage bus line ViniL is disposed on one of both opposing sides of the display area AA, one side is not limited to the left or right side.

Referring to FIG. 3, at least one optical area OA1 and OA2 may be disposed in the display area AA.

The at least one optical area OA1 and OA2 may be positioned so as to overlap at least one optical and electronic device, such as a capturing device such as a camera (an image sensor), and a detection sensor such as a proximity sensor and a luminance sensor.

For operation of the optical electronic device, the at least one optical area OA1 and OA2 may have a light transmissive structure and thus may have a transmittance equal to or greater than a predefined value. In other words, the number of pixels P per unit area in at least one optical area OA1 and OA2 may be smaller than the number of pixels P per unit area in a general area of the display area AA except for the at least one optical area OA1 and OA2. That is, a resolution of at least one optical area OA1 and OA2 may be lower than that of the general area of the display area AA.

The light transmissive structure of the at least one optical area OA1 and OA2 may be formed by patterning a cathode electrode in an area where the pixel P is not disposed. At this time, a portion of the cathode electrode to be patterned may be removed using a laser. Alternatively or additionally, the cathode electrode may be selectively formed so as to be patterned using a material such as a cathode deposition prevention layer.

Alternatively or additionally, the light transmissive structure of the at least one optical area OA1 and OA2 may be formed by forming the light-emitting element EL and the pixel circuit in a separated manner in the pixel P. In other words, the light-emitting element EL of the pixel P may be positioned on the at least one optical area OA1 and OA2, while a plurality of transistors TFT constituting the pixel circuit may be disposed around the at least one optical area OA1 and OA2, and the light-emitting element EL and the pixel circuit may be electrically connected to each other via a transparent metal layer.

The second scan driver 322_O and 322_E, the fourth scan driver 324, and the light-emission control signal driver 310 may be disposed in one side area around the display area AA. The first scan driver 321, the second scan driver 322_O and 322_E, and the third scan driver 323 may be disposed in the other side area around the display area AA. However, embodiments of the present disclosure are not limited thereto, and depending on an embodiment, at least one of the second scan driver 322_O and 322_E, the fourth scan driver 324, and the light-emission control signal driver 310 may be disposed in the other side area around the display area AA, while at least one of the first scan driver 321, the second scan driver 322_O and 322_E, and the third scan driver 323 may be disposed in one side area around the display area AA.

In one side area around the display area AA, the second scan drivers 322_O and 322_E may be disposed adjacent to the display area AA, and the fourth scan driver 324 may be disposed in the outermost area, and the light-emission control signal driver 310 may be disposed between the second scan driver 322_O and 322_E and the fourth scan driver 324.

Alternatively or additionally, in some embodiments, the light-emission control signal driver 310 may be disposed in the outermost area.

Furthermore, in the other side area around the display area AA, the second scan driver 322_O and 322_E may be disposed adjacent to the display area AA, and the first scan driver 321 may be disposed in the outermost area, and the third scan driver 323 may be disposed between the second scan driver 322_O and 322_E and the first scan driver 321.

Alternatively or additionally, depending on an embodiment, the third scan driver 323 may be disposed in the outermost area.

Furthermore, the second scan driver 322_O and 322_E may be divided into the odd-numbered scan driver 322_O and the even-numbered scan driver 322_E. The odd-numbered scan drivers 322_O may be respectively disposed on both opposing sides of the display area AA. The even-numbered scan drivers 322_E may be respectively disposed on both opposing sides of the display area AA. When the second scan driver operates such that the odd-numbered scan driver 322_O and the even-numbered scan driver 322_E operate separately, a sufficient time required for sampling the data voltage Vdata may be secured. Furthermore, the odd-numbered scan drivers 322_O are respectively disposed on both opposing sides of the display area AA, while the even-numbered scan drivers 322_E are respectively disposed on both opposing sides of the display area AA, thereby reducing a difference between sampling times of the data voltage Vdata in the pixels. Accordingly, as the second scan drivers 322_O and 322_E operate, the sufficient time for sampling may be secured and the difference between the sampling times thereof in the pixels may be reduced when sampling the data voltage Vdata, thereby improving the image quality of the display panel.

Figure 4:
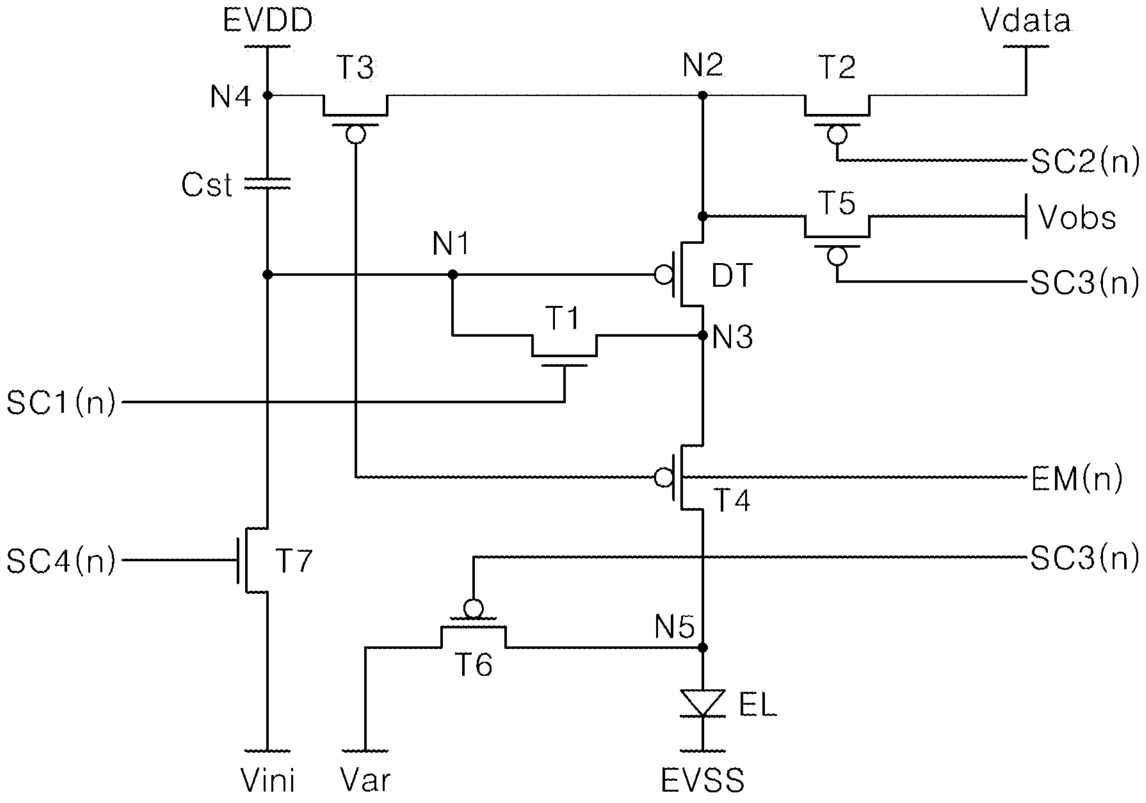
FIG. 4 is a diagram of a pixel circuit in a display device according to an embodiment of the present disclosure.

FIG. 4 is a diagram of a pixel circuit in a display device according to an embodiment of the present disclosure.

FIG. 4 only shows an example of a pixel circuit for illustration. A structure of the pixel circuit is not limited particularly as long as the structure thereof may apply a light-emission control signal EM(n) to the pixel to control the light-emission of the light-emitting element EL. For example, the pixel circuit may include a switching thin-film transistor connected to an additional scan signal, and a switching thin-film transistor to which an additional initialization voltage is applied. A connection relationship of the switching element or a connection position of the capacitor may vary. Hereinafter, for convenience of description, a display device with the pixel circuit structure of FIG. 4 is described.

Referring to FIG. 4, each of the plurality of pixels P may include a pixel circuit having the driving transistor DT and the light-emitting element EL connected to the pixel circuit.

The pixel circuit may control the driving current flowing through the light-emitting element EL to drive the light-emitting element EL. The pixel circuit may include the driving transistor DT, the first to seventh transistors T1 to T7, and the capacitor Cst. Each of the transistors DT, and T1 to T7 may include a first electrode, a second electrode, and a gate electrode. One of the first electrode and the second electrode may be a source electrode, and the other of the first electrode and the second electrode may be a drain electrode.

Each of the transistors DT, and T1 to T7 may be a P type thin-film transistor or an N type thin-film transistor. In an embodiment of FIG. 4, the first transistor T1 and the seventh transistor T7 are embodied as N type thin-film transistors, and the remaining transistors DT, and T2 to T6 are embodied as P type thin-film transistors. However, embodiments of the present disclosure are not limited thereto. According to an embodiment, each of all or some of the transistors DT, and T1 to T7 may be a P type thin-film transistor or an N type thin-film transistor. Furthermore, the N type thin-film transistor may be embodied as an oxide thin-film transistor. The P type thin-film transistor may be embodied as a polycrystalline silicon thin-film transistor.

Hereinafter, an example in which the first transistor T1 and the seventh transistor T7 are embodied as N type thin-film transistors, and the remaining transistors DT, and T2 to T6 are embodied as P type thin-film transistors is described. Accordingly, each of the first transistor T1 and the seventh transistor T7 may be turned on when a high voltage is applied thereto. Each of the remaining transistors DT, and T2 to T6 may be turned on when a low voltage is applied thereto.

According to one example, the first transistor T1 constituting the pixel circuit may function as a compensation transistor, the second transistor T2 may function as a data supply transistor, each of the third and fourth transistors T3 and T4 may function as a light-emission control transistor, the second transistor T2 may function as a data supply transistor, the fifth transistor T5 may function as a bias transistor, and each of the sixth and seventh transistors T6 and T7 may function as an initialization transistor.

The light-emitting element EL may include an anode electrode and a cathode electrode. The anode electrode of the light-emitting element EL may be connected to a fifth node N5, and the cathode electrode thereof may be connected to the low-potential driving voltage EVSS.

The driving transistor DT may include a first electrode connected to a second node N2, a second electrode connected to a third node N3, and a gate electrode connected to a first node N1. The driving transistor DT may provide a driving current Id to the light-emitting element EL based on a voltage of the first node N1 or a data voltage stored in the capacitor Cst, which will be described later.

The first transistor T1 may include a first electrode connected to the first node N1, a second electrode connected to the third node N3, and a gate electrode that receives a first scan signal SC1(n). The first transistor T1 may be turned on in response to the first scan signal SC1(n) such that a diode connection between the first node N1 and the third node N3 is established to sample a threshold voltage Vth of the driving transistor DT. This first transistor T1 may be a compensation transistor.

The capacitor Cst may be connected to and disposed between the first node N1 and the fourth node N4. The capacitor Cst may store therein or maintain the high potential driving voltage EVDD supplied thereto.

The second transistor T2 may include a first electrode connected to the data line DL or receiving the data voltage Vdata, a second electrode connected to the second node N2, and a gate electrode receiving a second scan signal SC2(n). The second transistor T2 may be turned on in response to the second scan signal SC2(n) and thus may transmit the data voltage Vdata to the second node N2. This second transistor T2 may be a data supply transistor.

The third transistor T3 and the fourth transistor T4 (or the first and second light-emission control transistors) may be connected to and disposed between the high potential driving voltage EVDD and the light-emitting element EL, and may establish a current flow path through which the driving current Id generated by the driving transistor DT flows.

The third transistor T3 may include a first electrode connected to the fourth node N4 to receive the high potential driving voltage EVDD, a second electrode connected to the second node N2, and a gate electrode that receives the light-emission control signal EM(n).

The fourth transistor T4 may include a first electrode connected to the third node N3, a second electrode connected to the fifth node N5 (or the anode electrode of the light-emitting element EL), and a gate electrode that receives the light-emission control signal EM(n).

Each of the third and fourth transistors T3 and T4 may be turned on in response to the light-emission control signal EM(n). In this case, the driving current Id may be provided to the light-emitting element EL, such that the light-emitting element EL may emit light at a luminance level corresponding to the driving current Id.

The fifth transistor T5 may include a first electrode receiving the bias voltage Vobs, a second electrode connected to the second node N2, and a gate electrode receiving a third scan signal SC3(n). This fifth transistor T5 may be a bias transistor.

The sixth transistor T6 may include a first electrode receiving the anode reset voltage Var, a second electrode connected to the fifth node N5, and a gate electrode receiving the third scan signal SC3(n).

The sixth transistor T6 may be turned on in response to the third scan signal SC3(n) before the light-emitting element EL emits light (or after the light-emitting element EL emits light), such that the anode electrode (or the pixel electrode) of the light-emitting element EL may be initialized based on the anode reset voltage Var.

The light-emitting element EL may have a parasitic capacitor generated between the anode electrode and the cathode electrode. Thus, while the light-emitting element EL emits light, the parasitic capacitor may be charged so that the anode electrode of the light-emitting element EL may have a specific voltage. Accordingly, an amount of charges accumulated in the light-emitting element EL may be initialized by applying the anode reset voltage Var to the anode electrode of the light-emitting element EL via the sixth transistor T6.

In the present disclosure, the fifth and sixth transistors T5 and T6 are configured such that the gate electrodes of the fifth and sixth transistors T5 and T6 commonly receive the third scan signal SC3(n). However, embodiments of the present disclosure are not necessarily limited thereto, and the fifth and sixth transistors T5 and T6 are configured such that the gate electrodes of the fifth and sixth transistors T5 and T6 receive separate scan signals and thus the fifth and sixth transistors T5 and T6 independently operate.

The seventh transistor T7 may include a first electrode receiving the initialization voltage Vini, a second electrode connected to the first node N1, and a gate electrode receiving a fourth scan signal SC4(n).

The seventh transistor T7 may be turned on in response to the fourth scan signal SC4(n) such that the capacitor Cst and the gate electrode of the driving transistor DT may be initialized using the initialization voltage Vini. Unnecessary charges may remain in the gate electrode of the driving transistor DT and the capacitor Cst. Accordingly, an amount of the remaining charge may be initialized by applying the initialization voltage Vini to the gate electrode of the driving transistor DT via the seventh transistor T7.

A display device according to an embodiment of the present disclosure may operate as a VRR mode display device. In the VRR mode, the display device operates at a constant frequency. when a high-speed operation is required, a refresh rate at which the data voltage Vdata is updated increases. Thus, the pixel operates at the increased refresh rate. When low power consumption or a low-speed operation is required, the refresh rate is lowered such that the pixel operates at the lowered refresh rate.

Each of the plurality of pixels P may operate based on a combination of a refresh frame and an anode reset frame within one set period, e.g., 1 second. In the present disclosure, one set is defined as a combination of one or more of a refresh frame in which the data voltage Vdata is updated or an anode reset frame in which the data voltage Vdata is not updated, which together last one set period, e.g., for 1 second. The combination of the refresh frame and the anode reset frame is repeated on a one set period basis.

When the device operates at a refresh rate of 120 Hz, only the refresh frame may be repeated. That is, the refresh frame may be repeated 120 times within 1 second. One refresh frame period is 1/120=8.33 ms, and one set period is also 8.33 ms.

When the refresh rate is 60 Hz, the refresh frame and the anode reset frame may be repeated alternately with each other. That is, the refresh frame and the anode reset frame may be alternately repeated with each other, such that each of the refresh frame and the anode reset frame may be repeated 60 times within 1 second. Thus, each of one refresh frame period and one anode reset frame is 0.5/60=8.33 ms, and one set period is 16.66 ms.

When the refresh rate is 1 Hz, one frame may be composed of one refresh frame, and 119 anode reset frames subsequent to the one refresh frame. Furthermore, when the refresh rate is 1 Hz, one frame may be composed of a plurality of refresh frames and a plurality of anode reset frames. In this regard, a period of each of one refresh frame and one anode reset frame is 1/120=8.33 ms, and one set period is 1 s.

In the refresh frame, a new data voltage Vdata is charged to apply the new data voltage Vdata to the driving transistor DT. In the anode reset frame, the data voltage Vdata of a previous frame is maintained. In this regard, the anode reset frame may be referred to as a skip period in the sense that a process of applying the new data voltage Vdata to the driving transistor DT is omitted in the anode reset frame.

Each of the plurality of pixels P may initialize the charged or remaining voltage within the pixel circuit during the refresh frame. Specifically, each of the plurality of pixels P may remove the influence of the data voltage Vdata and the high potential driving voltage EVDD stored in a previous frame Frame during the refresh frame. Accordingly, each of the plurality of pixels P may display an image corresponding to the new data voltage Vdata in the anode reset frame.

During the anode reset frame, each of the plurality of pixels P may provide the driving current corresponding to the data voltage Vdata to the light-emitting element EL to display an image and may maintain a turned-on state of the light-emitting element EL.

Figure 5:
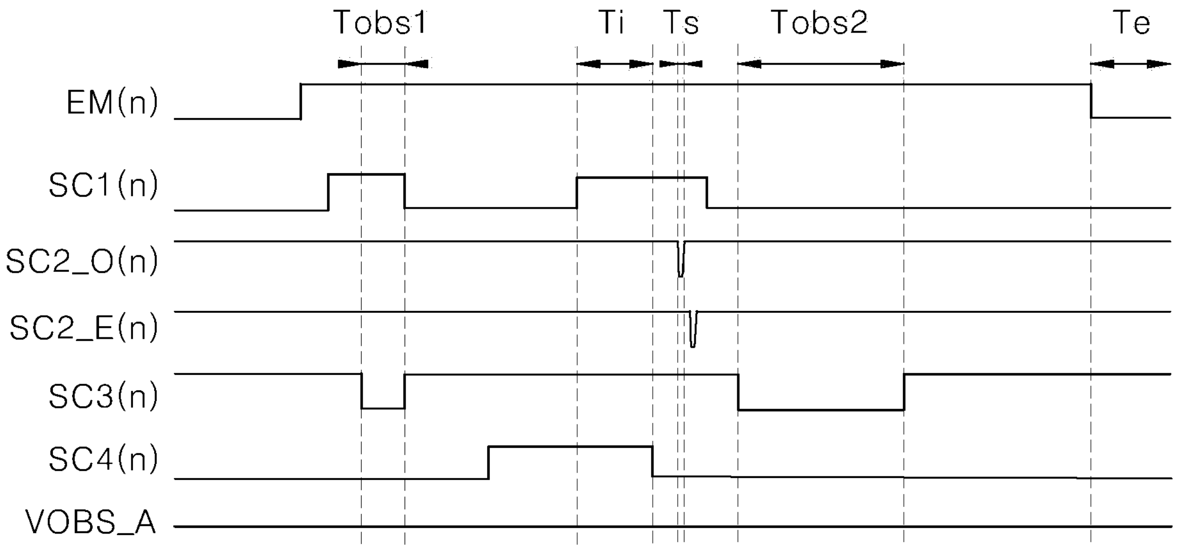
FIG. 5 is a diagram for illustrating application of a scan signal and a light-emission control signal and application of a bias voltage in a refresh frame of a pixel circuit as shown in FIG. 4.

First, FIG. 5 is a diagram for illustrating application of the scan signal and the light-emission control signal and the application of the bias voltage in the refresh frame of the pixel circuit as shown in FIG. 4.

An operation of the pixel circuit and the light-emitting element in the refresh frame is described with reference to FIG. 5.

The refresh frame may include at least one bias period Tobs1 and Tobs2, an initialization period Ti, a sampling period Ts, and a light-emission period Te. However, this is only an example, and embodiments of the present disclosure are necessarily limited to this order.

Referring to FIG. 5, the pixel circuit may operate such that at least one bias period Tobs1 and Tobs2 is included in the refresh frame. At least one bias period Tobs1 and Tobs2 refers to a period for which an on-bias stress operation to which the bias voltage Vobs is applied is performed.

During the refresh frame, a first bias voltage VOBS_A of a fixed level may be supplied to the pixel circuit. In one example, the first bias voltage VOBS_A may vary depending on a range of the data voltage Vdata, but may generally be in a range of 5V to 6V. For example, the first bias voltage VOBS_A may be supplied at a fixed value of 5.5V during the refresh frame.

In the first bias period Tobs1, the light-emission control signal EM(n) is at a high voltage, and the third and fourth transistors T3 and T4 are turned off. The first scan signal SC1(*n*) is at a high voltage and the fourth scan signal SC4(*n*) is at a low voltage, and the first transistor T1 is turned on and the seventh transistor T7 is turned off. The second scan signal SC2 is at a high voltage and the second transistor T2 is turned off.

In the second bias period Tobs2, the light-emission control signal EM(n) is at a high voltage, and the third and fourth transistors T3 and T4 are turned off. The first scan signal SC1(*n*) and the fourth scan signal SC4(*n*) are at a low voltage, and the first transistor T1 and the seventh transistor T7 are turned off. The second scan signal SC2 is at a high voltage and the second transistor T2 is turned off.

In the at least one bias period Tobs1 and Tobs2, the third scan signal SC3(*n*) of a low voltage is input, such that the fifth and sixth transistors T5 and T6 are turned on. As the fifth transistor T5 is turned on, the bias voltage Vobs is applied to the first electrode of the driving transistor DT connected to the second node N2.

In this regard, the bias voltage Vobs is supplied to the second node N2 as the source electrode of the driving transistor DT. Thus, in the light-emission period, a charging time or charging delay of the voltage of the fifth node N5 as the anode electrode of the light-emitting element EL may be reduced. The driving transistor DT is maintained at a stronger saturation state.

For example, as the bias voltage Vobs increases, the voltage of the second node N2 as the source electrode of the driving transistor DT may increase, and a gate-source voltage or a drain-source voltage of the driving transistor DT may decrease. Therefore, it is desirable that the bias voltage Vobs is greater than the data voltage Vdata.

In this regard, a magnitude of the drain-source current Id flowing through the driving transistor DT may be reduced, and a stress of the driving transistor DT may be reduced in a positive bias stress situation, thereby resolving the charging delay of the voltage of the third node N3. Furthermore, a hysteresis of the driving transistor DT may be alleviated by performing an on-bias stress operation thereon before sampling the threshold voltage Vth of the driving transistor DT.

Accordingly, in the at least one bias period Tobs1 and Tobs2, the bias stress operation may be defined as an operation of directly applying an appropriate bias voltage to the driving transistor DT during non-emission periods.

Furthermore, as the sixth transistor T6 may be turned on in at least one bias period Tobs1 and Tobs2, the anode electrode (or the pixel electrode) of the light-emitting element EL connected to the fifth node N5 is initialized with the anode reset voltage Var. In another example, the fifth and sixth transistors T5 and T6 may be configured such that the gate electrodes thereof receive separate scan signals and thus are independently controlled. That is, it is not necessarily required to simultaneously apply the bias voltage to the first electrode of the driving transistor DT and the anode electrode of the light-emitting element EL in the bias period.

The pixel circuit may operate such that the initialization period Ti is included in the refresh frame. The initialization period Ti refers to a period for which the voltage of the gate electrode of the driving transistor DT is initialized.

In the initialization period Ti, each of the first scan signal SC1(*n*), the fourth scan signal SC4(*n*), and the light-emission control signal EM(n) at a high voltage and the first transistor T1 and the seventh transistor T7 are turned on. The second to sixth transistors T2, T3, T4, T5, and T6 are turned-off. As the first and seventh transistors T1 and T7 are turned on, the gate electrode of the driving transistor DT connected to the first node N1 and the drain electrode of the driving transistor DT connected to the third node N3 are initialized with the initialization voltage Vini.

In a period between the initialization period T1 and the sampling period Ts as described later, each of the first scan signal SC1(*n*) and the light-emission control signal EM(n) is a high voltage and the fourth scan signal SC1(*n*) is at a low voltage. The first transistor T1 is maintained in the turned-on state, and the second to sixth transistors T2, T3, T4, T5, and T6 are maintained in the turned-off state, and the seventh transistor turns off. At this time, the threshold voltage Vth of the driving transistor DT may be sampled to the capacitor Cst under the maintained turned-on state of the first transistor T1 and the turned-off state of the seventh transistor.

The pixel circuit may operate such that the sampling period Ts is included in the refresh frame. The sampling period refers to a period for which the data voltage Vdata is sampled.

In the sampling period Ts, each of the first scan signal SC1(*n*), the third scan signal SC3(*n*), and the light-emission control signal EM(n) is at a high voltage, and the second scan signal SC2_O(n) to SC2_E(n) and the fourth scan signal SC4(*n*) of a low voltage are input. Accordingly, the third to seventh transistors T3, T4, T5, T6, and T7 are turned off, the first transistor T1 is maintained in the turned on state, and the second transistor T2 is turned on. That is, the second transistor T2 is turned on, such that the data voltage Vatat is applied to the driving transistor DT, and thus, the diode connection between the first node N1 and the third node N3 is established, such that the data voltage Vdata may be sampled. At this time, the threshold voltage Vth of the driving transistor DT may be canceled with the threshold voltage Vth previously sampled in the capacitor Cst, so that only the data voltage Vdata may be sampled to the capacitor Cst in the sampling period Ts.

The pixel circuit may operate such that the light-emission period Te is included in the refresh frame. The light-emission period Te refers to a period for which the light-emitting element EL emits light under the driving current corresponding to the sampled data voltage Vdata.

In the light-emission period Te, the light-emission control signal EM(n) is at a low voltage, and the third and fourth transistors T3 and T4 are turned on.

As the third transistor T3 is turned on, the high potential driving voltage EVDD connected to the fourth node N4 may be applied to the first electrode of the driving transistor DT connected to the second node N2 via the third transistor T3. The driving current Id supplied from the driving transistor DT to the light-emitting element EL via the fourth transistor T4 may depend on the data voltage Vdata value regardless of the value of the threshold voltage Vth of the driving transistor DT. Thus, the threshold voltage Vth of the driving transistor DT is compensated for.

Figure 6:
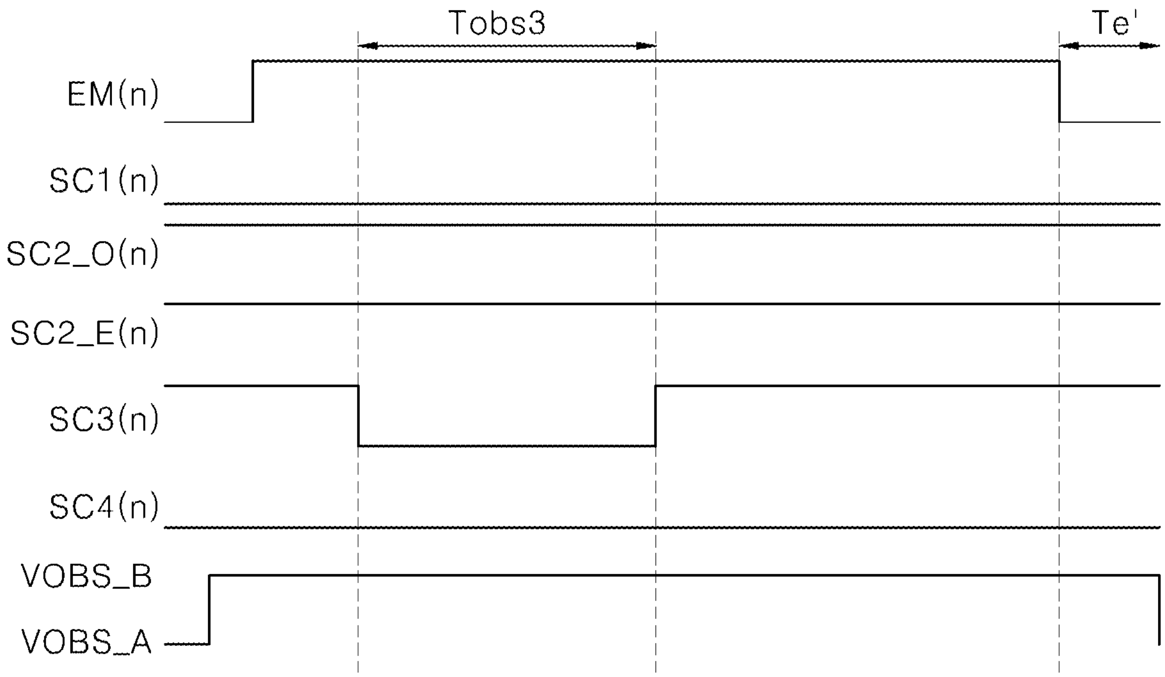
FIG. 6 is a diagram for illustrating application of a scan signal and a light-emission control signal and application of a bias voltage in an anode reset frame of the pixel circuit as shown in FIG. 4.

FIG. 6 is a diagram for illustrating application of the scan signal and the light-emission control signal and the application of the bias voltage in the anode reset frame of the pixel circuit as shown in FIG. 4.

In the anode reset frame, the bias voltage may be tuned. The tuning of the bias voltage may be performed based on the variable refresh rate. FIG. 6 illustrates a case where the refresh rate is 10 Hz in the VRR mode.

Referring to FIG. 6, the operation of the pixel circuit and the light-emitting element in the anode reset frame are described.

The anode reset frame may include a third bias period Tobs3 and a light-emission period Te'. The description of the same operation of the pixel circuit in the anode reset frame as the operation thereof in the refresh frame will be omitted.

As described above, in the refresh frame, the new data voltage Vdata is charged to apply the new data voltage Vdata to the gate electrode of the driving transistor DT. However, in the anode reset frame, the data voltage Vdata of the refresh frame is maintained. Therefore, unlike the refresh frame, the anode reset frame does not include the initialization period T1 and the sampling period Ts.

In the operation of the pixel circuit in the anode reset frame, it may suffice that only a single bias stress operation is performed. In this embodiment, it is illustrated that the bias stress operation is performed once. However, embodiments of the present disclosure are not limited thereto. In another embodiment, for the convenience of descriptions of the driver circuit, the third scan signal SC3(*n*) in the anode reset frame may be identical with that in the refresh frame, and as a result, in the anode reset frame, the on bias stress operation may be performed twice as in the refresh frame.

A difference between the driving signal in the above-described refresh frame and the driving signal in the anode reset frame is about the second and fourth scan signals SC2(*n*) and SC4(*n*). In the anode reset frame, the initialization period T1 and the sampling period Ts are not included. Thus, unlike the refresh frame, in the anode reset frame, the second scan signal SC2_O(n) to SC2_E(n) is always at an inactive logic level, e.g., high voltage, and the fourth scan signal SC4(*n*) is always at a low voltage. That is, the second and seventh transistors T2 and T7 are always turned off.

In the third bias period Tobs3, the light-emission control signal EM(n) is at a high voltage, and the third and fourth transistors T3 and T4 are turned off. Each of the first scan signal SC1(*n*) and the fourth scan signal SC4(*n*) is at a low voltage, and the first transistor T1 and the seventh transistor T7 are turned off. The second scan signal SC2 is at a high voltage and the second transistor T2 is turned off. The third scan signal SC3(*n*) is at a low voltage, and the fifth transistor T5 and sixth transistor T6 are turned on.

In the third bias period Tobs3, as the fifth transistor T5 is turned on, a second bias voltage VOBS_B is applied to the first electrode of the driving transistor DT connected to the second node N2.

In the anode reset frame, the display device applies the second bias voltage VOBS_B at a higher level than that of the first bias voltage VOBS_A applied to the first electrode of the driving transistor DT in the refresh frame to the first electrode of the driving transistor DT.

When the refresh rate is 10 Hz, the display device is configured to supply the first bias voltage VOBS_A in the refresh frame, maintain a level of the first bias voltage VOBS_A for a certain period of time between the refresh frame and the anode reset frame, and supply the second bias voltage VOBS_B higher than the first bias voltage VOBS_A to the pixel circuit during the anode reset frame.

In one example, the certain period of time between the refresh frame and the anode reset frame may be 8.3 ms. The second bias voltage VOBS_B may be higher than the first bias voltage VOBS_A. In one example, the first bias voltage VOBS_A may have a fixed value of 5.5V, and the second bias voltage VOBS_B may be pre-tuned to suit the characteristics of the display panel. In this regard, a second bias voltage VOBS_B tuning algorithm may find an tune-up point that reduces the flicker phenomenon after sweeping the second bias voltage VOBS_B at 10 Hz, 100 nits, and W255 PTN.

Furthermore, when the refresh rate falls in a first reference range of 10 Hz or higher, the display device may be configured to apply the first bias voltage VOBS_A before and after the anode reset frame, as shown in FIG. 6 and to apply the second bias voltage VOBS_B higher than the first bias voltage VOBS_A in the anode reset frame. In this regard, when the refresh rate is a frequency at which the device does not require the anode reset frame, the fixed first bias voltage VOBS_A as the bias voltage may be supplied thereto.

These embodiments are intended to reduce the flicker phenomenon that occurs in the low-speed operation in the VRR mode. The flicker level may depend on a balance between the first bias voltage VOBS_A applied thereto in the refresh frame and the second bias voltage VOBS_B applied thereto in the anode reset frame. The flicker level due to a right upward increasing component in the anode reset frame may vary depending on whether the refresh rate is greater than or equal to 10 Hz or is lower 10 Hz. Therefore, the adjustment of the bias voltage in the anode reset frame when the refresh rate is 10 Hz or higher should be performed independently from the adjustment of the bias voltage in the anode reset frame when the refresh rate is lower than 10 Hz.

Figure 7:
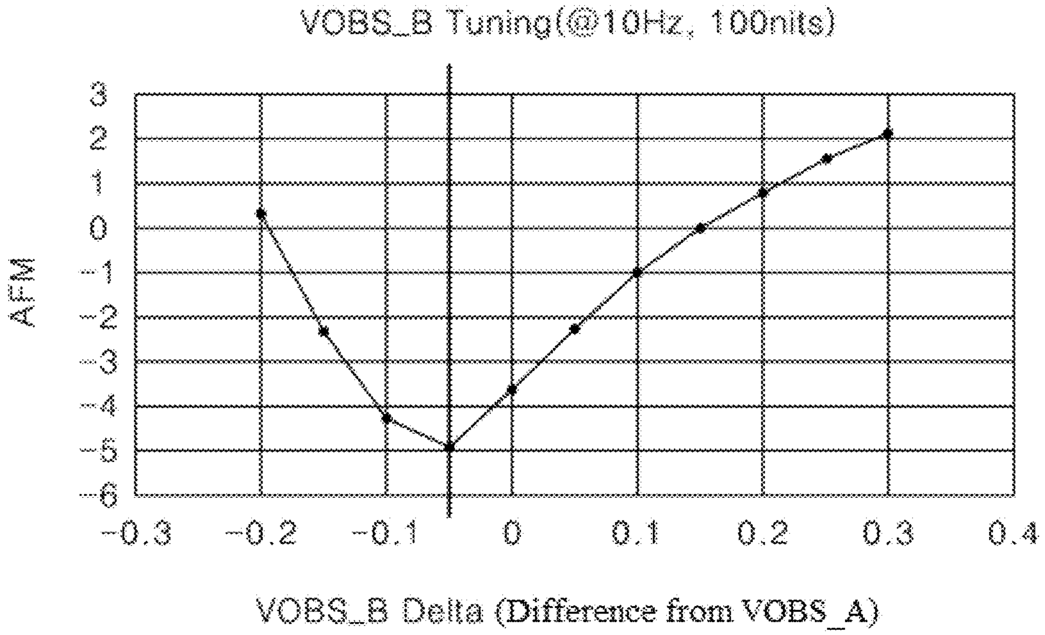
FIG. 7 is a diagram illustrating bias voltage tuning corresponding to a first refresh rate in an anode reset frame of the pixel circuit as shown in FIG. 4.

FIG. 7 is a diagram illustrating the bias voltage tuning in a first refresh rate and an anode reset frame of the pixel circuit as shown in FIG. 4. In one example, FIG. 7 illustrates an algorithm for optimizing the flicker characteristics at a first refresh rate of 10 Hz and luminance of 100 nits. In this regard, AFM may be defined as a value that quantifies the flicker characteristics based on a measuring result of the flicker phenomenon. The bias voltage that allows the AFM value to be lowered to the smallest value may improve the flicker characteristics.

In the refresh frame, the first bias voltage VOBS_A may be applied to the display panel, and in the anode reset frame, the second bias voltage VOBS_B may be applied to the display panel. In one example, the first bias voltage VOBS_A may have a fixed value of 5.5V. The second bias voltage VOBS_B may vary depending on the characteristics of the display panel.

VOBS_B Delta represents a difference between the first bias voltage VOBS_A and the second bias voltage VOBS_B. The VOBS_B Delta may be tuned to suit the display panel characteristics. The second bias voltage VOBS_B tuning algorithm may find the tune-up point that reduces the flicker characteristics after sweeping the second bias voltage VOBS_B at 10 Hz, 100 nits, and W255 PTN.

When the second bias voltage VOBS_B applied in FIG. 7 is applied at a second refresh rate of 1 Hz, the luminance may increase in the right upward direction during the anode reset frame, and thus the flicker phenomenon may be recognized. The 1 Hz flicker level may be based on the balance between the first bias voltage VOBS_A applied in the refresh frame and the second bias voltage VOBS_B applied in the anode reset frame. However, in the second bias voltage VOBS_B tuning algorithm, the optimization of the flicker level is performed at 10 Hz and 100 nits. Thus, 1 Hz low luminance and 0.2 nits flicker characteristics may not be considered by the second bias voltage VOBS_B tuning algorithm.

In accordance with the present disclosure, the flicker phenomenon may be reduced by independently performing the tuning of the bias voltage at the refresh rate of 10 Hz and the tuning of the bias voltage at the refresh rate of 1 Hz from each other. In the VRR mode, the display device may perform the tuning of the bias voltage based on a reference range to which the refresh rate variable in the anode reset frame belongs, and may supply the bias voltage tuned based on the reference range to the display panel.

Figure 8:
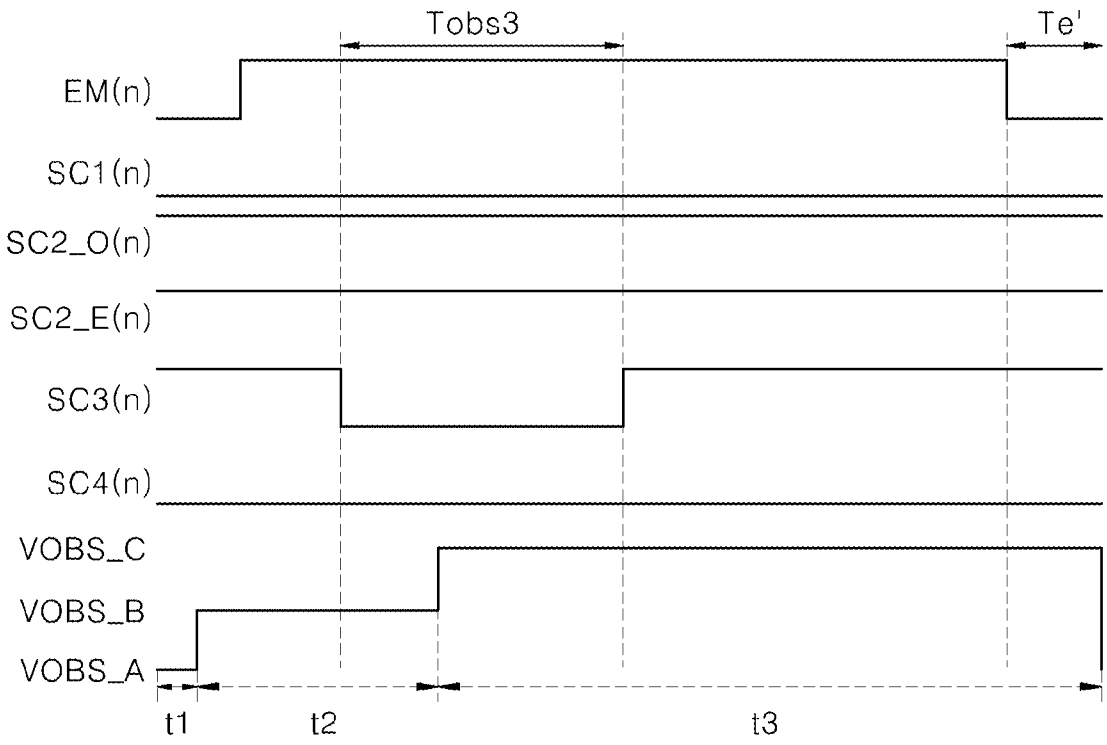
FIG. 8 is a diagram illustrating application of a bias voltage corresponding to a second refresh rate in an anode reset frame of the pixel circuit as shown in FIG. 4.

FIG. 8 is a diagram illustrating the application of the bias voltage corresponding to the second refresh rate in the anode reset frame of the pixel circuit as shown in FIG. 4. In one example, FIG. 8 shows the operation of the pixel circuit at the second refresh rate of 1 Hz. The descriptions of the scan signal and the light-emission control signal are the same as those in FIG. 6, and thus will be omitted.

When the refresh rate is 1 Hz, the display device supplies the first bias voltage VOBS_A to the pixel circuit in the refresh frame, and supplies the first bias voltage VOBS_A to the pixel circuit for a predetermined time duration t1 between the refresh frame and the anode reset frame.

Additionally, the display device may supply the second bias voltage VOBS_B higher than the first bias voltage VOBS_A to the pixel circuit for a predetermined time duration t2 during the anode reset frame, and may supply a third bias voltage VOBS_C higher than the second bias voltage VOBS_B to the pixel circuit for the remaining time duration t3 during the anode reset frame.

In one example, the time duration t1 between the refresh frame and the anode reset frame may be 8.3 ms. The time duration t2 during the anode reset frame may be exemplified as 91.7 ms. In this regard, the time duration t1 may be set as a time duration between the refresh frame and the anode reset frame. Furthermore, the predetermined time duration t2 may be set to be shorter than a time duration for which the flicker is recognized due to the luminance due to the right upward increasing component in the anode reset frame in the low-speed operation, for example, when the refresh rate is 1 Hz lower than 10 Hz. Furthermore, the predetermined time duration t3 may be set as the remaining time duration obtained by subtracting the predetermined time duration t2 from the anode reset frame. In one example, the first bias voltage VOBS_A may have a fixed value of 5.5V, and the second bias voltage VOBS_B may be pre-tuned to suit the characteristics of the display panel. In one example, the second bias voltage VOBS_B tuning algorithm may find the tune-up point that improves the flicker characteristics after sweeping the second bias voltage VOBS_B at 10 Hz, 100 nits, and W255 PTN. A third bias voltage VOBS_C tuning algorithm may find a tune-up point for improving the flicker characteristics at 1 Hz, 10 nits, and W42 PTN. The bias voltage tuning algorithm may independently improve or tune up the flicker characteristics based on whether the refresh rate is 10 Hz or 1 Hz.

Embodiments of the present disclosure do not limit the tuning environment of the bias voltage. Rather, the bias voltage may be independently tuned based on the reference range to which the refresh rate belongs to. Thus, at least one of the level and the application time of the bias voltage may be adjusted based on the refresh rate. In one example, the 1 Hz flicker phenomenon may be reduced by additionally applying the third bias voltage VOBS_C=VOBS_B+Delta used only after the predetermined time duration of 91.7 ms has elapsed (<10 Hz) during the anode reset frame. In this regard, the second bias voltage VOBS_B tuning algorithm may find the tune-up point that improves the flicker characteristics at 10 Hz, 100 nits, and W255 PTN. The third bias voltage VOBS_C tuning algorithm may find the tune-up point for improving the flicker characteristics at 1 Hz, 10 nits, and W42 PTN to reduce the 1 Hz low luminance flicker phenomenon.

In one example, the first bias voltage VOBS_A may vary depending on the range of the data voltage Vdata, but may generally be in a range of 5V to 6V. Each of the second bias voltage VOBS_B and the third bias voltage VOBS_C may be in a range of the first bias voltage VOBS_A-200 mV to the first bias voltage VOBS_A+300 Mv. When each of the second bias voltage VOBS_B and the third bias voltage VOBS_C exceeds the above defined range, visual evaluation defects may occur due to a significant difference between the first bias voltage VOBS_A in the refresh frame and the second bias voltage VOBS_B in the anode reset frame. Accordingly, each of the second bias voltage VOBS_B and the third bias voltage VOBS_C may be tuned to suit the characteristics of the display panel and within a range in which each of the second bias voltage VOBS_B and the third bias voltage VOBS_C does not cause the visual evaluation defects. When the second bias voltage VOBS_B is applied when the refresh rate is 10 Hz or higher. The third bias voltage VOBS_C is applied when the refresh rate is lower than 10 Hz. Thus, the visual evaluation defects do not occur.

When the refresh rate falls within a second reference range, the display device may be configured to supply the first bias voltage VOBS_A before and after the anode reset frame, supply the second bias voltage VOBS_B higher than the first bias voltage VOBS_A for a predetermined time duration t1 of the anode reset frame, and supply the third bias voltage VOBS_C higher than the second bias voltage VOBS_B for the remaining time duration t3 of the anode reset frame. In this regard, the second reference range may be set to be lower than 10 Hz. These embodiments are intended to reduce the flicker phenomenon that occurs in the low-speed operation in the VRR mode. The flicker level may depend on the balance between the first bias voltage VOBS_A applied in the refresh frame and the second bias voltage VOBS_B applied in the anode reset frame. The flicker level due to a right upward increasing component in the anode reset frame may vary depending on whether the refresh rate is greater than or equal to 10 Hz or is lower 10 Hz. Therefore, the adjustment of the bias voltage in the anode reset frame when the refresh rate is 10 Hz or higher should be performed independently from the adjustment of the bias voltage in the anode reset frame when the refresh rate is lower than 10 Hz.

In one example, when the refresh rate is 10 Hz, the display device supplies the first bias voltage VOBS_A to the pixel circuit during the refresh frame, maintains the level of the first bias voltage VOBS_A for a certain period of time between the refresh frame and the anode reset frame, and supplies the second bias voltage VOBS_B higher than the first bias voltage VOBS_A during the anode reset frame.

Furthermore, when the refresh rate is 1 Hz, the display device supplies the first bias voltage VOBS_A to the pixel circuit during the refresh frame, and supplies the second bias voltage VOBS_B higher than the first bias voltage VOBS_A thereto for the predetermined time duration t1 of the anode reset frame, and supplies the third bias voltage VOBS_C that is higher than the second bias voltage VOBS_B thereto for the remaining time duration t3 of the anode reset frame.

Furthermore, the display device may supply the first bias voltage VOBS_A of a fixed level to the pixel circuit during the refresh frame in the VRR mode. In one example, tuning the bias voltage may include adjusting at least one of the level and the application time of the bias voltage in each of the first and second reference ranges which the refresh rate falls into. In this regard, the display device may control at least one of the power supply 500 and the gate driver 300 to adjust at least one of the level and the application time of the bias voltage.

Figure 9:
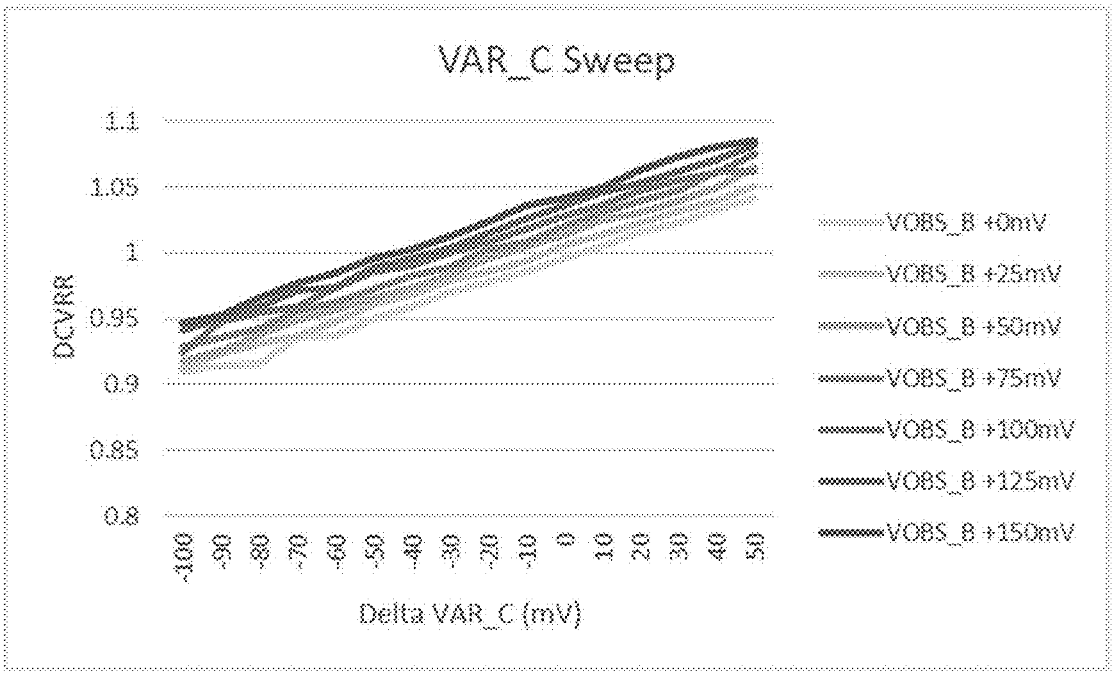
FIG. 9 shows anode reset voltage tendency as a bias voltage increases in a pixel circuit as shown in FIG. 4.

FIG. 9 shows the anode reset voltage tendency as the bias voltage increases in the pixel circuit as shown in FIG. 4.

The display device may adjust the anode reset voltage VAR based on a step-by-step level of the third bias voltage VOBS_C. In one example, the anode reset voltage VAR may be applied as a fixed value in the refresh frame and the anode reset frame where the refresh rate is 10 Hz or higher. The anode reset voltage VAR may be adjusted depending on the third bias voltage VOBS_C in the anode reset frame when the refresh rate is lower than 10 Hz, for example, is 1 Hz. The optimization of the anode reset voltage VAR_C in which the anode reset voltage VAR_C is adjusted based on the step-by-step level of the third bias voltage VOBS_C may be performed based on DCVRR (1 Hz to 60 Hz).

When the refresh rate is 1 Hz, the display device may be configured to supply the anode reset voltage VAR of a fixed value to the pixel circuit during a predetermined time duration t1 of the anode reset frame, and supply an anode reset voltage VAR_C lower than the fixed value applied in the refresh frame during a remaining time duration t2 of the anode reset frame.

In this regard, the anode reset voltage VAR_C may vary depending on a difference between the second bias voltage VOBS_B and the third bias voltage VOBS_C in the anode reset frame. The anode reset voltage VAR_C may be set to decrease as the difference value between the second bias voltage VOBS_B and the third bias voltage VOBS_C increases. In one example, when the difference value between the second bias voltage VOBS_B and the third bias voltage VOBS_C increases from 25 mV to 150 mV, the variation value in the anode reset voltage VAR_C may decrease from 10 mV to −50 mV. In other words, a variation value delta VAR_C of the anode reset voltage VAR decreases as the difference value between the second bias voltage VOBS_B and the third bias voltage VOBS_C increases, as shown in FIG. 9.

In one example, based on a result of measuring the flicker phenomenon at 1 Hz, 10 nits, and W42, the third bias voltage VOBS_C tuning algorithm may reduce the flicker characteristic AFM from an average of −0.6 to an average of −2.3, compared to the second bias voltage VOBS_B tuning algorithm.

A display device according to various aspects and features of the present disclosure may be described as follows.

A first aspect of the present disclosure provides a display device comprising: a display panel including a plurality of pixels; and a power supply for supplying a bias voltage and an anode reset voltage to the plurality of pixels, wherein when the display device operates in a VRR (Variable Refresh Rate) mode, the display device is configured to adjust at least one of a level and an application time of the bias voltage based on a refresh rate in an anode reset frame.

According to some features of the display device of the first aspect, when the refresh rate falls within a first reference range, the display device is configured to apply a first bias voltage in a refresh frame, and apply a second bias voltage higher than the first bias voltage in the anode reset frame.

According to some features of the display device of the first aspect, the first reference range is set to be 10 Hz or higher.

According to some features of the display device of the first aspect, when the refresh rate falls within a second reference range, the display device is configured to apply a first bias voltage in a refresh frame, apply a second bias voltage higher than the first bias voltage for a predetermined timed duration of the anode reset frame, and apply a third bias voltage higher than the second bias voltage for a remaining time duration of the anode reset frame.

According to some features of the display device of the first aspect, when the refresh rate falls within the second reference range, the display device is configured to: apply the anode reset voltage of a fixed level equal to a level of the anode reset voltage applied in the refresh frame for the predetermined time duration of the anode reset frame; and apply the anode reset voltage of a level adjusted to be lower than the level of the anode reset voltage applied in the refresh frame for the remaining time duration of the anode reset frame.

According to some features of the display device of the first aspect, the anode reset voltage of the level applied in for the remaining time duration of the anode reset frame varies depending on a difference value between the second bias voltage and the third bias voltage.

According to some features of the display device of the first aspect, a difference between the level of the anode reset voltage applied for the remaining time duration of the anode reset frame and the level of the anode reset voltage applied in the refresh frame decreases as the difference value between the second bias voltage and the third bias voltage increases.

According to some features of the display device of the first aspect, the second reference range is set to be lower than 10 Hz.

According to some features of the display device of the first aspect, the display device further comprises a gate driver for applying a gate signal to the display panel, wherein the display device is configured to control at least one of the power supply and the gate driver to adjust at least one of the level and the application time of the bias voltage.

According to some features of the display device of the first aspect, the display device is configured to adjust at least one of the level and the application time of the bias voltage in different manners depending on different reference ranges which the refresh rate falls within.

According to some features of the display device of the first aspect, the display device is configured to apply the bias voltage of a fixed level in a refresh frame.

A second aspect of the present disclosure provides a display device comprising: a display panel including a plurality of pixels, wherein each of the plurality of pixels includes: a light-emitting element for emitting light in response to a driving current; a driving transistor configured to control the driving current; a capacitor connected to and disposed between a high potential driving voltage and a gate electrode of the driving transistor; a first transistor configured to connect the gate electrode and a drain electrode of the driving transistor to each other in response to a first scan signal; a second transistor configured to apply a data voltage to a source electrode of the driving transistor in response to a second scan signal; a third transistor configured to apply the high-potential driving voltage to the source electrode of the driving transistor in response to a light-emission control signal; a fourth transistor configured to connect the drain electrode of the driving transistor and the light-emitting element to each other in response to the light-emission control signal to establish a current flow path between the high-potential driving voltage and the low-potential driving voltage; and a fifth transistor configured to apply a bias voltage to the source electrode of the driving transistor in response to a third scan signal, wherein when the display device operates in a VRR (Variable Refresh Rate) mode, the display device is configured to adjust at least one of a level and an application time of the bias voltage based on a refresh rate in an anode reset frame.

According to some features of the display device of the second aspect, when the refresh rate falls within a first reference range, the display device is configured to apply a first bias voltage in a refresh frame, and apply a second bias voltage higher than the first bias voltage in the anode reset frame.

According to some features of the display device of the second aspect, the first reference range is set to be 10 Hz or higher.

According to some features of the display device of the second aspect, when the refresh rate falls within a second reference range, the display device is configured to apply a first bias voltage in a refresh frame, apply a second bias voltage higher than the first bias voltage for a predetermined timed duration of the anode reset frame, and apply a third bias voltage higher than the second bias voltage for a remaining time duration of the anode reset frame.

According to some features of the display device of the second aspect, the pixel further includes a sixth transistor configured to apply an anode reset voltage to an anode electrode of the light-emitting element and the drain electrode of the driving transistor in response to the third scan signal, wherein when the refresh rate falls within the second reference range, the display device is configured to: apply the anode reset voltage of a fixed level equal to a level of the anode reset voltage applied in the refresh frame for the predetermined time duration of the anode reset frame; and apply the anode reset voltage of a level adjusted to be lower than the level of the anode reset voltage applied in the refresh frame for the remaining time duration of the anode reset frame.

According to some features of the display device of the second aspect, the anode reset voltage of the level applied in for the remaining time duration of the anode reset frame varies depending on a difference value between the second bias voltage and the third bias voltage.

According to some features of the display device of the second aspect, the second reference range is set to be lower than 10 Hz.

According to some features of the display device of the second aspect, when the display device operates in the VRR mode, the display device is configured to apply a first bias voltage of a fixed level in a refresh frame.

According to some features of the display device of the second aspect, the display device is configured to adjust at least one of the level and the application time of the bias voltage in different manners depending on different reference ranges which the refresh rate falls within.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

In the description herein, the active (or turn-on) or inactive (or turn-off) pulses of the signals may be described with example logic levels, e.g., high level or low level, which do not limit the scope of the disclosure. A signal may be configured to be active at high logic levels or at low logic levels, which are all included in the scope of the disclosure, and neither of which limit the scope of the disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a plurality of pixels; and a power supply for supplying a bias voltage and an anode reset voltage to the plurality of pixels, wherein when the display device operates in a variable refresh rate (VRR) mode, the display device is configured to adjust at least one of a level or an application time of the bias voltage based on a refresh rate in an anode reset frame, and wherein when the refresh rate falls within a second reference range, the display device is configured to:

apply the anode reset voltage of a fixed level equal to a level of the anode reset voltage applied in a refresh frame for a predetermined time duration of the anode reset frame; and apply the anode reset voltage of a level lower than the level of the anode reset voltage applied in the refresh frame for a remaining time duration of the anode reset frame.

2. The display device of claim 1, wherein when the refresh rate falls within a first reference range, the display device is configured to apply a first bias voltage in the refresh frame, and apply a second bias voltage higher than the first bias voltage in the anode reset frame.

3. The display device of claim 2, wherein the first reference range is 10 Hz or higher.

4. The display device of claim 1, wherein when the refresh rate falls within the second reference range, the display device is configured to apply a first bias voltage in the refresh frame, apply a second bias voltage higher than the first bias voltage for the predetermined time duration of the anode reset frame, and apply a third bias voltage higher than the second bias voltage for the remaining time duration of the anode reset frame.

5. The display device of claim 4, wherein the level of the anode reset voltage applied for the remaining time duration of the anode reset frame varies based on a difference value between the second bias voltage and the third bias voltage.

6. The display device of claim 5, wherein a difference between the level of the anode reset voltage applied for the remaining time duration of the anode reset frame and the level of the anode reset voltage applied in the refresh frame decreases as the difference value between the second bias voltage and the third bias voltage increases.

7. The display device of claim 4, wherein the second reference range is lower than 10 Hz.

8. The display device of claim 1, wherein the display device further comprises a gate driver for applying a gate signal to the display panel, wherein the display device is configured to control at least one of the power supply or the gate driver to adjust at least one of the level or the application time of the bias voltage.

9. The display device of claim 8, wherein the display device is configured to adjust at least one of the level or the application time of the bias voltage in different manners based on different reference ranges which the refresh rate falls within.

10. The display device of claim 1, wherein the display device is configured to apply the bias voltage of a fixed level in a refresh frame.

11. A display device comprising:

a display panel including a plurality of pixels, wherein each of the plurality of pixels includes:

a light-emitting element configured to emit light in response to a driving current;

a driving transistor configured to control the driving current;

a capacitor connected between a high potential driving voltage and a gate electrode of the driving transistor;

a first transistor configured to connect the gate electrode and a drain electrode of the driving transistor to each other in response to a first scan signal;

a second transistor configured to apply a data voltage to a source electrode of the driving transistor in response to a second scan signal;

a third transistor configured to apply the high-potential driving voltage to the source electrode of the driving transistor in response to a light-emission control signal;

a fourth transistor configured to connect the drain electrode of the driving transistor and the light-emitting element to each other in response to the light-emission control signal to establish a current flow path between the high-potential driving voltage and the low-potential driving voltage;

a fifth transistor configured to apply a bias voltage to the source electrode of the driving transistor in response to a third scan signal; and a sixth transistor configured to apply an anode reset voltage to an anode electrode of the light-emitting element and the drain electrode of the driving transistor in response to the third scan signal, wherein when the display device operates in a Variable Refresh Rate (VRR) mode, the display device is configured to adjust at least one of a level or an application time of the bias voltage based on a refresh rate in an anode reset frame, and wherein when the refresh rate falls within a second reference range, the display device is configured to:

apply the anode reset voltage of a fixed level equal to a level of the anode reset voltage applied in a refresh frame for a predetermined time duration of the anode reset frame; and apply the anode reset voltage of a level lower than the level of the anode reset voltage applied in the refresh frame for a remaining time duration of the anode reset frame.

12. The display device of claim 11, wherein when the refresh rate falls within a first reference range, the display device is configured to apply a first bias voltage in the refresh frame, and apply a second bias voltage higher than the first bias voltage in the anode reset frame.

13. The display device of claim 12, wherein the first reference range is 10 Hz or higher.

14. The display device of claim 11, wherein when the refresh rate falls within a second reference range, the display device is configured to apply a first bias voltage in the refresh frame, apply a second bias voltage higher than the first bias voltage for the predetermined timed duration of the anode reset frame, and apply a third bias voltage higher than the second bias voltage for the remaining time duration of the anode reset frame.

15. The display device of claim 14, wherein the level of the anode reset voltage applied for the remaining time duration of the anode reset frame varies based on a difference value between the second bias voltage and the third bias voltage.

16. The display device of claim 14, wherein the second reference range is lower than 10 Hz.

17. The display device of claim 11, wherein when the display device operates in the VRR mode, the display device is configured to apply a first bias voltage of a fixed level in a refresh frame.

18. The display device of claim 11, wherein the display device is configured to adjust at least one of the level and the application time of the bias voltage in different manners based on different reference ranges which the refresh rate falls within.

19. A display device comprising:

a display panel including a plurality of pixels, each pixel including a bias transistor and a driving transistor;

a gate driver configured to control the bias transistor to apply a first bias voltage to a terminal of the driving transistor in a refresh frame and to apply a second bias voltage to the terminal of the driving transistor in an anode reset frame, the second bias voltage greater than the first bias voltage, wherein the display device operates in a variable refresh rate (VRR) mode, and wherein a voltage value of the second bias voltage is variable based on a refresh rate of an operation of the display device, and wherein when the refresh rate falls within a second reference range, the display device is configured to:

apply an anode reset voltage of a fixed level equal to a level of the anode reset voltage applied in the refresh frame for a predetermined time duration of the anode reset frame; and apply the anode reset voltage of a level lower than the level of the anode reset voltage applied in the refresh frame for a remaining time duration of the anode reset frame.

20. The display device of claim 19, wherein in response to the refresh rate being higher than a threshold, the second bias voltage maintains a same value for the anode reset frame.

21. The display device of claim 19, wherein in response to the refresh rate being smaller than a threshold, the second bias voltage includes a first voltage value at a first period of time in the anode reset frame and a second voltage value at a second period of time in the anode reset frame, the second period of time subsequent to the first period of time, and the second voltage value greater than the first voltage value.

22. The display device of claim 19, wherein an application time of the second bias voltage varies based on the refresh rate of the operation of the display device.

* * * * *